United States Patent [19]
Morishita et al.

[11] Patent Number: 5,905,351
[45] Date of Patent: May 18, 1999

[54] ACTUATOR CONTROLLER USING PERIODIC SIGNAL

[75] Inventors: Mimpei Morishita, Fuchu; Takashi Shigemasa, Yokohama; Masakuni Akashi, Shinjuku-ku, all of Japan

[73] Assignee: Kabushiki Kaisha Toshiba, Kawasaki-shi, Japan

[21] Appl. No.: 09/113,563

[22] Filed: Jul. 10, 1998

[30] Foreign Application Priority Data

Dec. 1, 1997 [JP] Japan ................................ 9-330343

[51] Int. Cl.[6] ...................................................... G05B 1/02
[52] U.S. Cl. ........................ 318/606; 318/560; 318/567
[58] Field of Search ................................... 318/560, 606, 318/567; 388/805, 814

[56] References Cited

U.S. PATENT DOCUMENTS 4,091,294  5/1978  Zanki et al. ............................ 318/606
5,647,477  7/1997  Morishita .

FOREIGN PATENT DOCUMENTS 5-30402  2/1993  Japan .
7-23598  1/1995  Japan .

Primary Examiner—Karen Masih
Attorney, Agent, or Firm—Oblon, Spivak, McClelland, Maier & Neustadt, P.C.

[57] ABSTRACT

An actuator controller using a periodic signal includes: an actuating unit for moving a movable portion with respect to a fixed portion by a predetermined amount; a drive unit for operation the movement; a power supply unit for supplying an electric power to the drive unit; and a periodic signal generating unit, which includes a velocity command signal generating part for generating a velocity command signal on the basis of an output of the movable portion, and a driving frequency calculating part for determining the frequency of the periodic signal in accordance with the velocity command signal. The driving frequency calculating part comprises: a digital control calculating part for deriving a control pulse signal frequency f for moving the movable portion; a stochastic output calculating part for calculating an output by a probability on the basis of the frequency f and a sampling frequency fs, or an error correcting part for correcting an error of the frequency; and a frequency quantizing part for quantizing the frequency, the error of which has been corrected. With this construction, it is possible to smoothly and accurately control the movable portion of the periodic signal drive system even if there is a little memory capacity, and it is possible to achieve a precise movement.

18 Claims, 20 Drawing Sheets

ACTUATOR CONTROLLER USING PERIODIC SIGNAL

BACKGROUND OF THE INVENTION

The present invention relates generally to an actuator controller using a periodic signal for moving a movable portion of an actuator by a predetermined amount every one cycle of a periodic signal. More specifically, the invention relates to an actuator controller, which is made of a piezoelectric element and which is capable of driving an actuator, such as an inch warmer and a stepping motor, at a suitably controlled velocity.

A typical actuator, such as a stepping motor, comprises: a drive unit serving as driving means for moving or rotating a movable portion of an actuator by a predetermined amount when a given pulse is inputted thereto; a drive amplifier serving as power supply means for supplying an electric power to the drive unit on the basis of an inputted predetermined periodic signal; and periodic signal generating means for generating a periodic signal to be inputted to the drive amplifier. Therefore, in an actuator of this type (which will be hereinafter referred to as a "periodic signal driven actuator"), the moving amount of the movable portion of the actuator can be recognized by counting the cycle of the signal inputted to the drive amplifier. If no periodic signal is inputted, the movable portion of the actuator is not moved to be held by a fixed portion thereof. In view of this characteristic, the periodic signal driven actuator is suitably used for positioning or moving an object in accordance with a specific pattern.

In order to control the movement of an object by means of the periodic signal driven actuator, there is a typical method for detecting the position of the object by means of an external sensor or by counting the frequency of the periodic signal, to input a periodic signal having a given frequency or a given frequency pattern to the drive amplifier until the object reaches a predetermined position. Periodic signal generating means for generating the periodic signal often comprises a microcomputer. For example, Japanese Patent Application Laid-Open No. 7-23598 (1995) discloses that the frequency pattern of a motor driving pulse is generated in accordance with the position of a stepping motor to be supplied to a drive circuit block serving as a drive amplifier to drive a motor.

The periodic signal is often changed in accordance with physical conditions, which created by a moving object mounted on a movable portion of a stepping motor, to be inputted to a drive unit to drive an actuator. Japanese Patent Application Laid-Open No. 5-30402 (1993) discloses a periodic signal driven system utilizing a control method for carrying out the focus adjustment of a focus lens by means of a stepping motor.

However, the periodic signal driven system utilizing the control method triggers on the basis of the position of the object and the physical conditions to generate a given frequency or a given frequency pattern, so that there is a problem in that it is not possible to smoothly control the movement in accordance with the moving state of the object which changes every moment.

In addition, the frequency pattern as well as the position of the object and the physical conditions must be previously stored as data, so that there is a problem in that the required memory capacity increases in accordance with the precision and complexity required in control specifications.

SUMMARY OF THE INVENTION

It is therefore an object of the present invention to eliminate the aforementioned problems and to provide an actuator controller using a periodic signal, which can achieve a high-accuracy and precise movement of a movable portion even if there is a little memory capacity.

In order to accomplish the aforementioned object, according to an aspect of the present invention, an actuator controller using a periodic signal comprises: an actuating unit having a fixed portion and a movable portion; a drive unit for moving the movable portion with respect to the fixed portion by a predetermined amount every one cycle of a periodic signal inputted from the outside; a power supply unit for supplying a driving power to the drive unit; and a periodic signal generating unit for generating and supplying the periodic signal to the drive unit: in which the periodic signal generating unit comprises a velocity command signal generating element for generating a velocity command signal on the basis of an output detected by the movable portion of the actuating unit, and a driving frequency calculating element for variably setting a frequency of the periodic signal per a predetermined period of time by a predetermined calculation in accordance with variation in the velocity command signal generated by the velocity command signal generating element.

As described above, according to the present invention, the movement of an object to be controlled and which is mounted on a movable portion of an actuator driven by a periodic signal, is measured for a predetermined sampling period of time, and a periodic signal inputted to a drive amplifier every sampling period of time, which is the same as the predetermined sampling period of time, is calculated on the basis of the measured results so that the movement of the object to be controlled is a predetermined movement, thereby controlling the movement of the object to be controlled. In this case, it is required to generate a periodic signal, which has a period longer than a sampling frequency defined by an inverse number of a predetermined sampling time, and a periodic signal, which has a period other than a period integral number times as large as the sampling frequency. For example, assuming that the value obtained by dividing the velocity command value of the movable portion by a predetermined moving amount of the movable portion every one cycle of the periodic signal is f and that the inverse number of the predetermined period of time (the sampling time) is a predetermined frequency (a sampling period) fs, if the driving frequency calculating means generates a periodic signal of (n+1) cycles at a probability of (f/fs−n) and a periodic signal of n cycles at a probability of {1−(f/fs−n)} within the predetermined period of time with respect to an integer part n of f/fs, it is possible to substantially obtain the same movement as the movement of the movable portion of the actuator serving as the actuating part at the frequency command value f.

Moreover, the velocity command value of the movable portion can be obtained by the sum of a value, which is obtained by multiplying the position command signal by a predetermined gain, and a value, which is obtained by multiplying an output signal of a first-order module, the input of which is the position command signal, by a predetermined gain. Therefore, when the velocity command value is obtained on the basis of the position detected result of the movable portion, it is not required to differentiate a position information to convert the position information into a velocity information, and it is possible to obtain a frequency command value f, which is difficult to be under the influence of noises and which has no time-lag on the velocity information.

Also, in the periodic signal generating unit, the quantization error between the quantized frequency and the original continuous frequency may be corrected by the error correcting means to correct the influence of the quantization error on the control system.

As a result, even if the digital control at a predetermined sampling frequency is applied to the actuator controller using a periodic signal for controlling actuating system (actuator), it is possible to move the movable portion of the actuator can be moved by a periodic signal of optional cycles every sampling time, and it is also possible to smoothly control the movement of the object to be controlled, which changes every moment. In addition, it is not required to use any data converting table and so forth because the periodic signal is produced by a stochastic calculation, so that it is possible to greatly reduce the memory capacity.

DESCRIPTION OF THE PREFERRED EMBODIMENTS

Referring now to the accompanying drawings, the preferred embodiments of an actuator controller using a periodic signal, according to the present invention, will be described in detail below.

Figure 1:
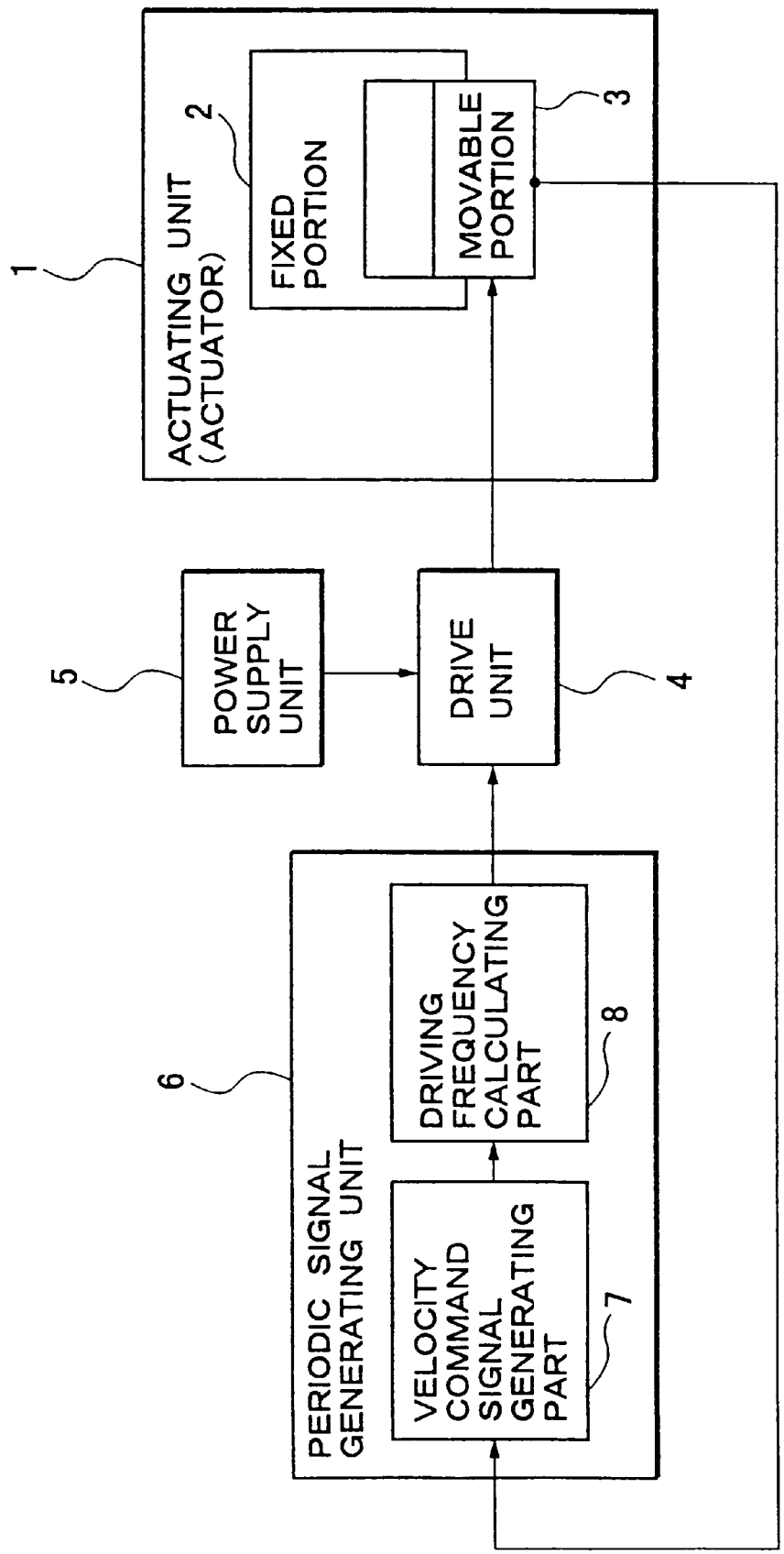
FIG. 1 is a block diagram showing the first preferred embodiment of a periodic signal drive system according to the present invention as a basic conception of a periodic signal drive system according to the present invention.

FIG. 1 is a block diagram of the first preferred embodiment of an actuator controller using a periodic signal according to the present invention, which includes a basic concept of the present invention. In FIG. 1, the actuator controller using a periodic signal in the first preferred embodiment comprises: an actuating unit (actuator) 1 having a fixed portion 2 and a movable portion 3; a drive unit 4 for moving the movable portion 3 with respect to the fixed portion 2 by a predetermined amount every one cycle of a periodic signal inputted form the outside; a power supply unit 5 for supplying the drive unit 4 with an electric power for moving the movable portion 3 in accordance with the inputted periodic signal; and a periodic signal generating unit 6 for generating and supplying the periodic signal to the drive unit 4. The periodic signal generating unit 6 comprises: a velocity command signal generating part 7 for detecting the output of the movable portion 3 to generate a velocity command signal on the basis of the output of the movable portion 3; and a driving frequency calculating part 8 for variably setting the frequency of the periodic signal per a predetermined period of time by a predetermined calculation in accordance with the velocity command signal generated by the velocity command signal generating part 7.

With this construction, the operation of the actuator controller using a periodic signal will be described below.

The predetermined calculating methods of the driving frequency calculating part 8 include: a method for calculating the probability of occurrence of a quantization error with respect to a continuous frequency every a predetermined number of samplings in a digital control, to generate an error compensated velocity command signal using the calculated probability; and a method for using the last sampling signal in a continuous frequency to generate an error compensated velocity command signal on the basis of the current and last quantization errors. In the former, in order to stochastically generate a periodic signal, e.g., a pulse signal for driving the actuating unit 1, such as an actuator, every sampling in the digital control, the driving frequency calculating part 8, which is realized by a computer or the like, generates a random number r ranging from 0 to 1, and compares the random number r to a numeric value h ranging from 0 to 1 obtained by the above described (f/fs−n). When r≦h, pulses may be generated in the sampling period (n+1)×fs times, and when r>h, pulses may be generated in the sampling period n×fs times. However, for simple explanation, it is assumed that f>0 in the above operation.

Figure 2:
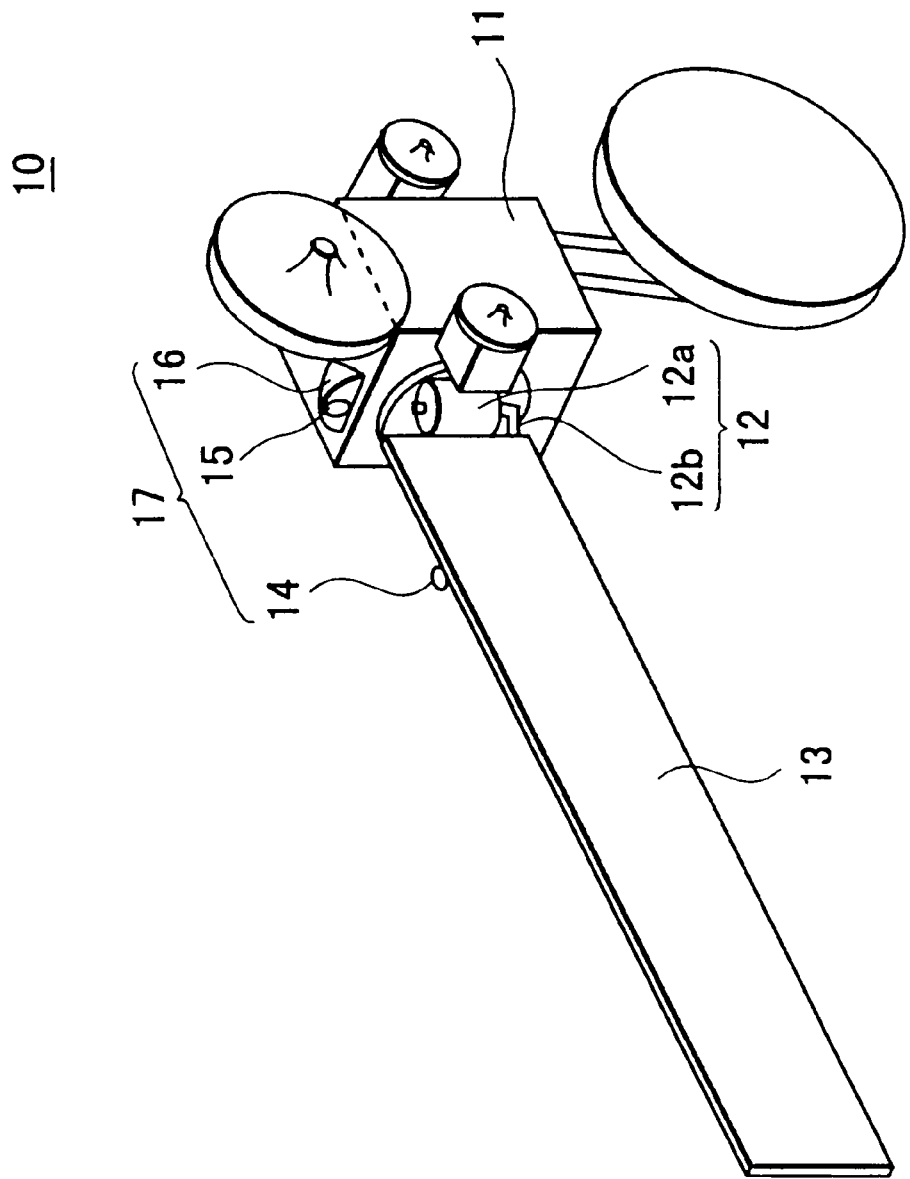
FIG. 2 is a perspective view of a damping device of an artificial satellite, to which the second preferred embodiment of a periodic signal drive system according to the present invention is applied.

As a more detailed construction of the present invention, referring to FIGS. 2 and 3, the second preferred embodiment of a periodic signal drive system according to the present invention, which is applied to an artificial satellite, will be described below. FIG. 2 shows a damping device for damping the vibration of a solar battery mounting paddle of an artificial satellite by means of the second preferred embodiment of a periodic signal drive system according to the present invention, and FIG. 3 is a block diagram of a principal part of the second preferred embodiment of a periodic signal drive system according to the present invention.

As shown in FIG. 2, an artificial satellite 10 comprises a satellite body 11, a rotary stepping motor 12, and a solar battery mounting paddle 13 rotatably connected to the satellite body 11 via the stepping motor 12. That is, both ends of a rotating shaft 12b serving as a movable portion are fixed to one end of the paddle 13, and a cylindrical drive portion 12a of the stepping motor 12, which serves as a fixed and drive portion, is fixed to the satellite body 11. A target 14 for detecting the vibration of the paddle 13 is mounted on the paddle 13 at a position corresponding to one fourth of the total length thereof from the center of the rotating shaft 12b of the paddle 13. The position of the target 14 is picked up by means of a CCD camera 15 mounted on the satellite body 11 to detect a rotation angle θ1 of deflection by means of an image processing unit 16. The rotation angle θ1 of deflection is defined by a crossed axes angle of a line, which is drawn between an end of the rotating shaft 12b and the target 14, with respect to a reference line which is a straight line drawn between the center-of-gravity line of the satellite body 11 and the center of the rotating shaft 12b. In this second preferred embodiment, a sensor part 17 is formed by the target 14, the CCD camera 15 and the image processing unit 16.

Figure 3:
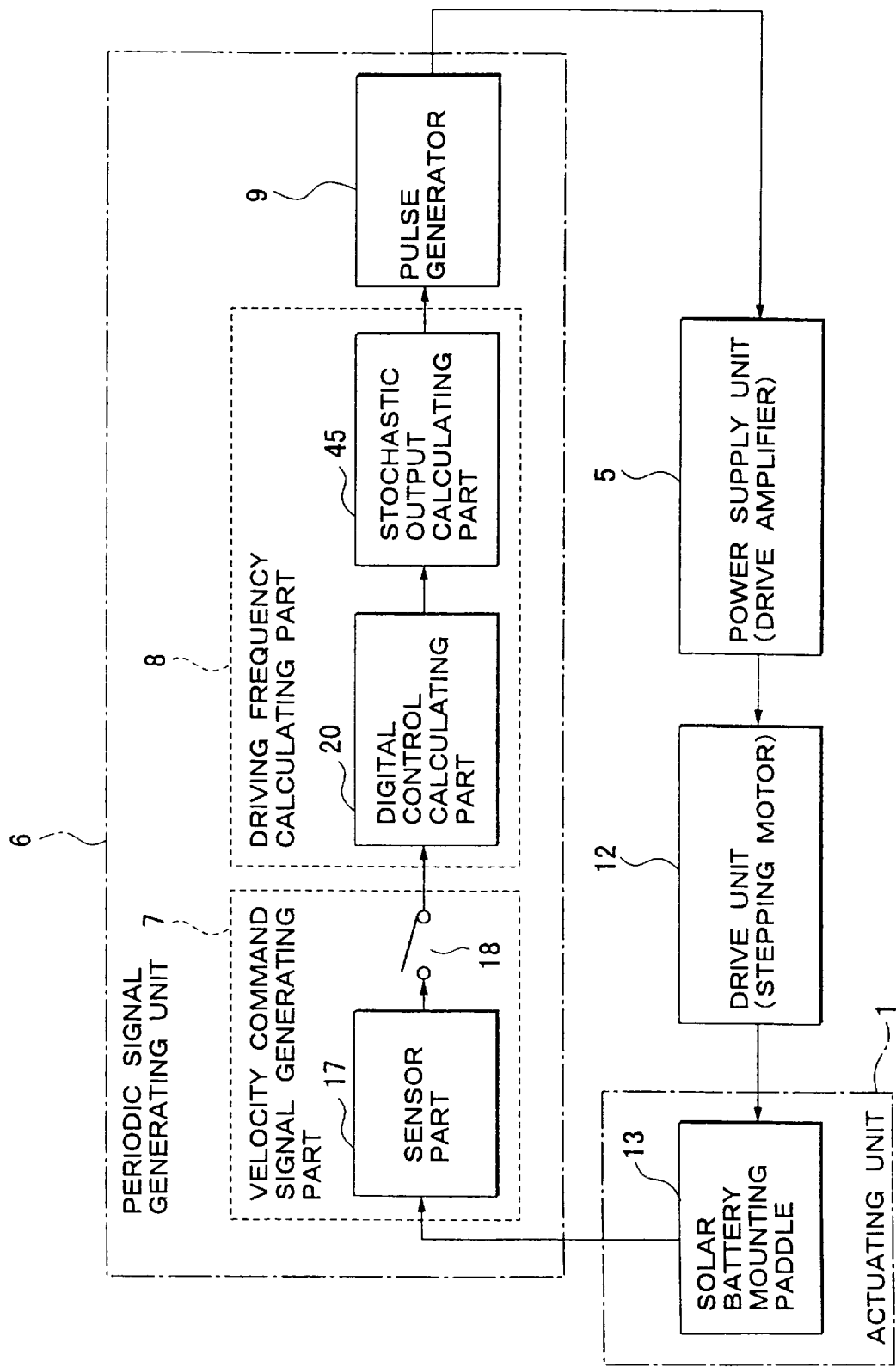
FIG. 3 is a block diagram of the second preferred embodiment of a periodic signal drive system according to the present invention.

Referring to FIG. 3, the second preferred embodiment of a periodic signal drive system according to the present invention, which is applied to the damping unit for the artificial satellite with the above construction, will be described below.

In FIG. 3, the stepping motor 12 is a drive unit for moving the rotating shaft 12b serving as the movable portion by a predetermined amount with respect to the drive portion 12a every one cycle of a periodic signal inputted from the outside. Reference number 5 denotes a drive amplifier serving as a power supply unit for supplying an electric power to carry out the above described operation of the stepping motor 12 on the basis of the periodic signal inputted from the outside, and reference number 6 denotes a periodic signal generating unit for calculating the periodic signal inputted to the drive amplifier 5.

Similar to the first preferred embodiment, the periodic signal generating unit 6 comprises velocity command signal generating part 7, driving frequency calculating part 8, and a pulse generator 9 for generating a pulse signal on the basis of the calculated results of the driving frequency calculating part 8. The velocity command signal generating part 7 comprises a sensor part 17 for detecting the movement of the solar battery mounting paddle 13 driven by the stepping motor 12, and a sampler 18 comprising, e.g., an A/D converter, for sampling the output of the sensor part 17 at a predetermined frequency fs. The driving frequency calculating means 8 acquires data of the sensor part 17 from the sampler 18 to calculate a driving frequency, at which the rotating shaft 12b of the stepping motor 12 rotates, on the basis of the data of the sensor part 17. The driving frequency calculating means 8 comprises a digital control calculating part 20 and a stochastic output calculating part 45.

The digital control calculating part 20 calculates a frequency f of a control pulse signal for actuating the movable portion of the actuator in order to control the movement of an object to be controlled, and outputs the calculated results to the stochastic output calculating part 45. On the other hand, the stochastic output calculating part 45 calculates an integer part n of f/fs on the basis of the control pulse signal frequency f and a sampling frequency fs, which have been calculated by the digital control calculating part 20, and generates a random number r ranging from 0 to 1 every sampling to compare the random number r to a numerical number h ranging from 0 to 1 obtained by the above described (f/fs−n). When r≦h, the stochastic output calculating part 45 outputs a frequency value of (n+1)×fs Hz as the calculated result, and when r>h, the stochastic output calculating part 45 outputs a frequency value of n×fs Hz as the calculated result. The calculated results of the frequency outputted from the stochastic output calculating part 45 are introduced into the pulse generator 9 to drive the stepping motor 12 via the drive amplifier 5 to damp the vibration of the paddle 13.

Figure 4:
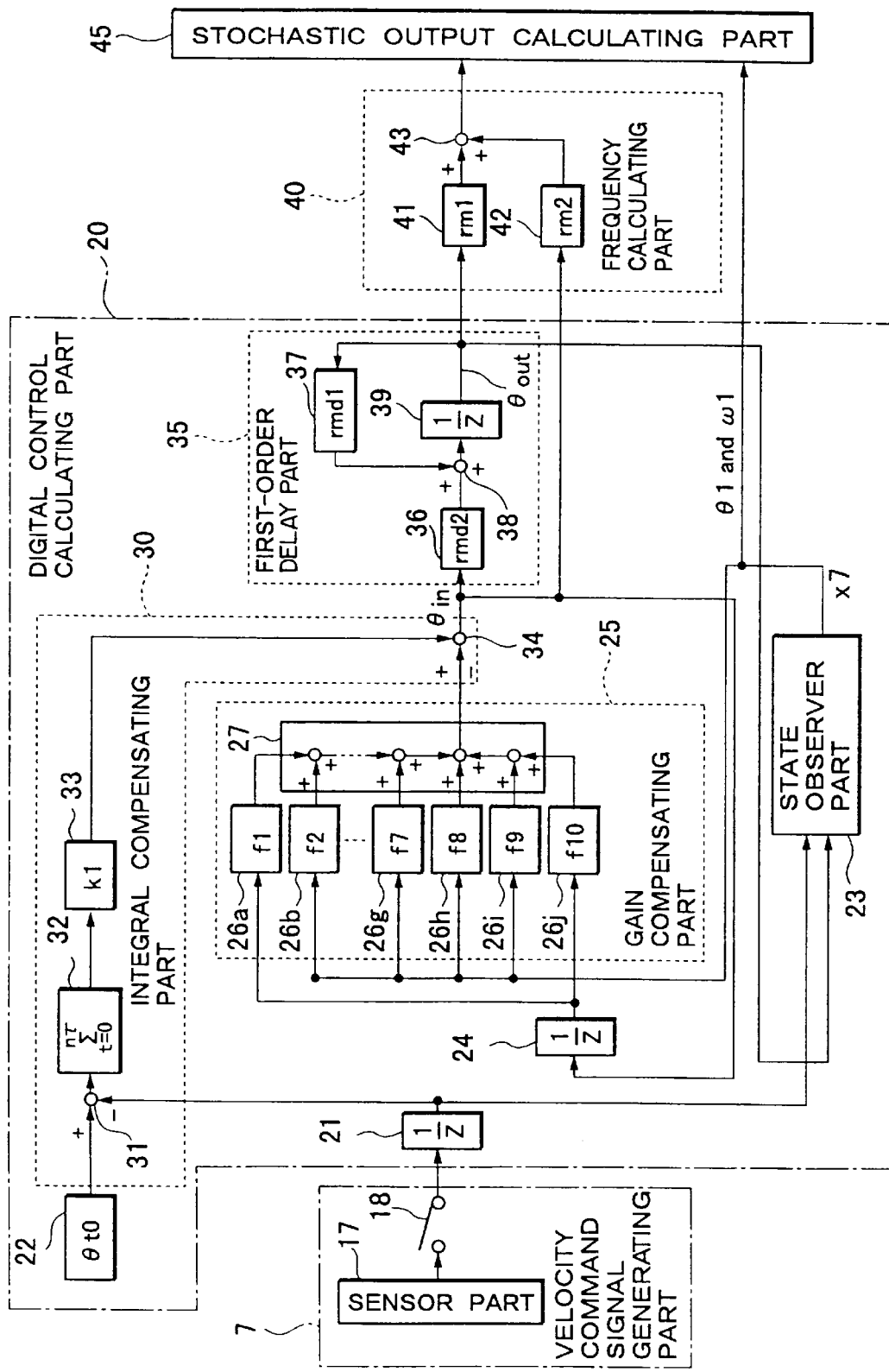
FIG. 4 is a block diagram of a digital control calculating part of FIG. 3.

As shown in FIG. 4, the digital control calculating part 20 of the damping device comprises a digital delay module 21, a target value generating part 22 for outputting a target value θt0 of the θ1, a state observer part 23, a digital delay module 24, a gain compensating part 25, an integral compensating part 30, and a first-order delay part 35. The input and output of the first-order delay part 35 are supplied to a frequency calculating part 40.

Figure 5:
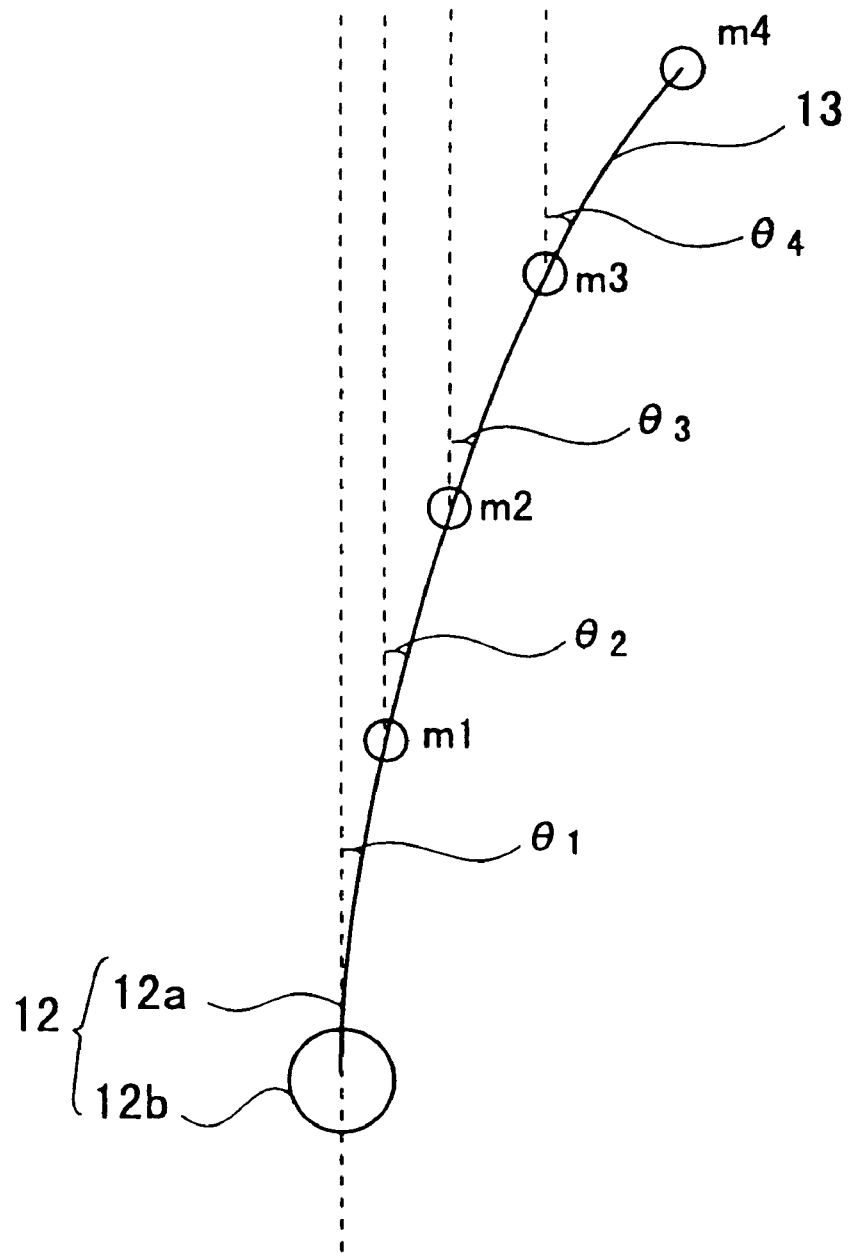
FIG. 5 is a characteristic diagram schematically showing the operation of a model to be controlled by means of the damping device of FIG. 2.

The digital delay module 21 receives a rotation angle θ1 of deflection detected by the sensor part 17 via the sampler 18 to output a value $θ1_{-1}$, which is the θ1 of the last sample. Furthermore, the value of the last sample outputted from the digital delay module 21 is indicated by a subscript of −1($_{-1}$). The state observer part 23 inputs a rotation angle $θ1_{-1}$ of deflection and a rotation angle $θout_{-1}$ of the rotating shaft 12b of the stepping motor 12, which will be described later, to output the values of the respective rotation angles $θ1_{-1}$, $θ2_{-1}$, $θ3_{-1}$ and $θ4_{-1}$ of deflection at the respective mass points m1, m2, m3 and m4 in a four-mass-point model of the paddle shown in FIG. 5 and the rotational angular velocities $ω1_{-1}$ through $ω4_{-1}$ and $θout_{-1}$ thereof. The rotation angles $θ2_{-1}$ through $θ4_{-1}$ of deflection are also crossed axes angles between straight lines, which are drawn between the mass points m2 through m4 and the last mass points, and the above described reference line, respectively. In addition, it is assumed that m2, m3 and m4 are positioned at positions corresponding to half, three quarters and the end of the total length of the paddle 2, respectively. Moreover, out of the outputs of the state observer part 23, the $θ1_{-1}$ is a measured value, the $θout_{-1}$ is the output of the first-order delay module 35, and other outputs are estimates. The $θ1_{-1}$ and the $ω1_{-1}$ are also outputted to the stochastic output calculating part 45.

The gain compensating part 25 comprises: gain compensators 26a through 26j for multiplying the rotation angles $θ1_{-1}$, $θ2_{-1}$, $θ3_{-1}$, and $θ4_{-1}$, and the rotational angular velocities $ω1_{-1}$ through $ω4_{-1}$ and $θout_{-1}$, which are the outputs of the state observer part 23, and the output $θin_{-1}$ of the digital delay module 24, by a predetermined gain, respectively; and an adder 27 for calculating the sum of the outputs of the gain compensators 26a–26j.

The integral compensating part 30 comprises: a subtracter 31 for subtracting the rotation angle $\theta1_{-1}$ from the output value $\theta t0$ of the target value generating part 22; a digital integrator 32 for calculating the sum of the subtracted results of the subtracter 31 every sampling; a gain compensator 33 for multiplying the output value of the digital integrator 32 by a predetermined gain; and a subtracter 34 for subtracting the output value of the adder 27 of the gain compensating part 25 from the output value of the gain compensator 33 to output the subtracted result $\theta in$. The subtracted result $\theta in$ is introduced, via the digital delay module 24 for outputting the value $\theta in_{-1}$ of the last sample, into the gain compensator 25 as described above, as well as into the first-order delay part 35 and the frequency calculating part 40.

The first-order delay part 35 comprises: a first gain part 36 for multiplying the introduced $\theta in_{-1}$ by a predetermined gain; a second gain part 37 for multiplying the output of the first-order delay part 35 by a predetermined gain; an adder 38 for adding the output value of the first gain part 36 to the output value of the second gain part 37; and a digital delay module 39 for introducing the added result of the adder 38 to output the added result of the last sample. The output $\theta out_{-1}$ of the digital delay module 39 is introduced into the second gain part 37 as well as into the state observer part 23 and the frequency calculating part 40. The respective gains rmd2 and rmd1 of the first and second gain parts 36 and 37 are determined so that the output $\theta out_{-1}$ of the digital delay module 39 is equivalent to the rotation angle $\theta out$ of the rotating shaft 12b.

The frequency calculating part 40 comprises: third and fourth gain parts 41 and 42 for multiplying the output value $\theta in$ of the subtracter 34 of the frequency calculating part 40 and the output value $\theta out$ of the first-order delay part 35 by a predetermined gain, respectively; and an adder 43 for adding the output values of the third and fourth gain parts 41 and 42. The output of the adder 43 is the frequency f of the control pulse signal for moving the rotation axis 12b of the stepping motor 12 in order to control the movement of an object to be controlled by the output of the adder 43.

Figure 6:
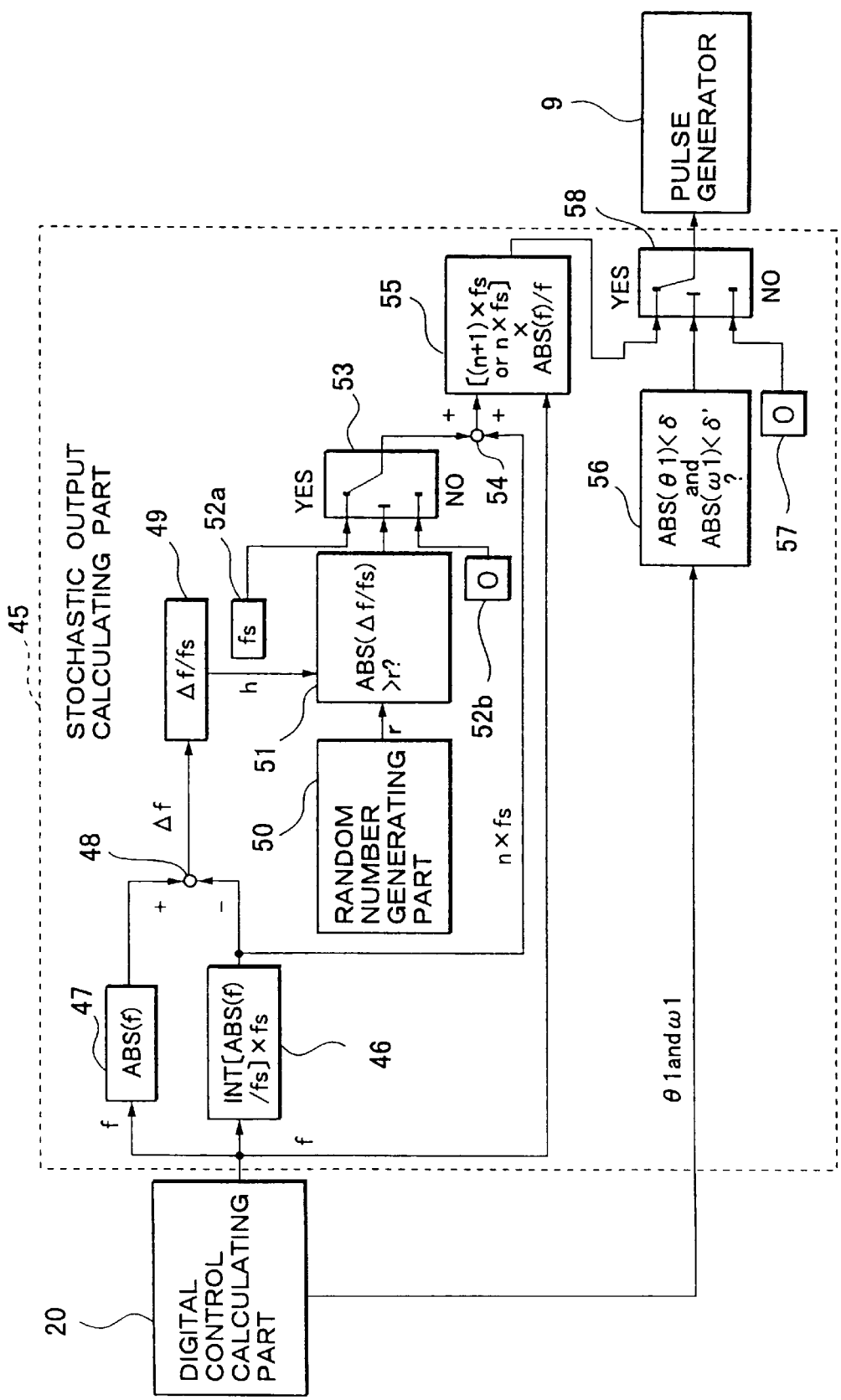
FIG. 6 is a block diagram of a stochastic output calculating part of FIG. 3.

As shown in FIG. 6, the stochastic output calculating part 45 comprises: a quantizing part 46 for inputting the frequency f, which has been calculated by the digital control calculating part 20, to calculate a non-negative integer part n of f/fs with respect to the sampling frequency fs to output n×fs; an absolute value calculating part 47 for deriving the absolute value of the frequency f; a subtracter part 48 for calculating a difference between the quantized frequency n×fs and the absolute value of the frequency f; a rate calculating part 49 for inputting an output value $\Delta f$ of the subtracter part 48 to calculate a rate of the $\Delta f$ to the fs; a random number generating part 50 for generating a random number r ranging from 0 to 1; a comparing part 51 for comparing an output h of the rate calculating part 49 to an output r of the random number generating part 50; a constant part 52a for outputting a sampling frequency fs; a constant part 52b for outputting a zero constant; a switching part 53 for switching to a YES side when h>r in the compared results of the comparing part 51 and to a NO side when it is not so; an adding part 54 for adding the output fs of the switching part 53 or 0 to the output n×fs of the quantizing part 46; a sign calculating part 55 for introducing the output of the adding part 54 and frequency f to cause the output of the adding part 54 to have the same sign as that of the frequency f; a comparing part 56 for introducing the $\theta 1$ and the $\omega 1$ from the digital calculating part 20 to determine whether the absolute values thereof remain being smaller than predetermined values $\delta$ and $\delta'$ approximating 0 for a predetermined period of time or more; a constant part 57 for outputting a zero constant; and a switching part 58 for switching to the YES side when it is determined by the compared results of the comparing part 56 that the absolute values of the $\theta 1$ and $\omega 1$ introduced from the digital calculating part 20 remain being smaller than the predetermined values $\delta$ and $\delta'$ approximating 0 for the predetermined period of time or more, and to the NO side when it is not so, to output the calculated results to the pulse generator 9.

The operation of the second preferred embodiment of a periodic signal drive system according to the present invention will be described below.

When the paddle 13 vibrates by changing the attitude of the satellite body 11, the target 14 swings. The swinging of the target 14 is converted to a swinging angle of the paddle, i.e., the rotation angle $\theta 1$ of deflection, by means of the CCD camera 15 and the image processing unit 16. The rotation angle $\theta 1$ of deflection is fed to the digital delay module 21 of the digital control calculating part 20 via the sampler 18. In the digital control calculating part 20, the rotation angle $\theta 1$ of deflection is introduced into the subtracter 31 as well as into the state observer part 23.

In the state observer part 23, the rotation angles $\theta 2_{-1}, \theta 3_{-1}$ and $\theta 4_{-1}$ and the rotational angular velocities $\omega 1_{-1}$ through $\omega 4_{-1}$ are calculated on the basis of the rotation angle $\theta 1$ of deflection introduced by the digital delay module 21 to be introduced into the gain compensators 26b through 26i of the gain compensating part 25, respectively. On the other hand, the rotation angle $\theta 1$, which has been used for the calculation, and the $\theta out_{-1}$, which has been outputted from the first-order delay module 35 (the rotation angle $\theta 1_{-1}$ has not been changed at this time), have been outputted to the gain compensator 26a and 26i of the gain compensating part 25, respectively.

In the gain compensating part 25, the data introduced from the state observer part 23 and the output $\theta in_{-1}$ of the digital delay module 24 are multiplied by gains f1 through f10. The multiplied results are added by the adder 27 to be outputted to the adder 34 provided in the integral compensating part 30.

On the other hand, in the subtracter 31 of the integral compensating part 30, the target value $\theta t0$ of the rotation angle of deflection is compared to the $\theta 1_{-1}$, and the subtracted result is introduced into the digital integrator 32. In the digital integrator 32 of the integral compensating part 30, the subtracted result of the subtracter 31 is integrated, and the integrated result is multiplied by a gain k1 of the gain compensator 33 to be outputted to the subtracter 34. In the subtracter 34, the output of the gain compensating part 25 is compared to the output of the gain compensator 33, and the subtracted result $\theta in$ is outputted. This subtracted result $\theta in$ is outputted to the first-order delay part 35 and the frequency calculating part 40 as well as to the gain compensator 26j, which is provided in the gain compensating part 25, as $\theta in_{-1}$ by the digital delay module 24 when the next sampling is carried out.

Thus, the target rotation angle $\theta in$ of the rotating shaft 12b for controlling the vibration of deflection generated in the paddle 2 is calculated. In this second preferred embodiment, the $\theta out$ following the target rotation angle $\theta in$ with the first-order delay by means of the first-order delay part 35 is generated, so that the rotation of the stepping motor 12 follows the $\theta out$. Therefore, even if the $\theta in$ rapidly changes, the loss of synchronism of the rotating shaft 12b with the driving part 12a is not caused.

In the first-order delay part 35, the θin$_{-1}$ is introduced into the first gain part 36 to be multiplied by the gain rmd2 to be outputted to the adder 38. In the adder 38, the value obtained by multiplying the θout$_{-1}$ (zero in this time), which is the value of the θout of the last sample, by the gain rm1 is added to the output of the first gain part 36 to be introduced into the digital delay module 39 to be held therein, and the θout$_{-1}$ is outputted. As mentioned above, this θout$_{-1}$ is introduced into the state observer part 23 as well as into the frequency calculating part 40.

In the frequency calculating part 40, the driving frequency f is calculated using the introduced θout$_{-1}$ and θin$_{-1}$ as follows. That is, since the θout$_{-1}$ is a first-order delay with respect to the θin$_{-1}$, assuming that the time constant of the first-order delay is Tf, ωout being a time differential of the θout can be expressed as follows.

$$\omega out = (-\theta out + \theta in)/Tf$$

Assuming that a proportional constant is R, the following relationship is established.

$$f = R \cdot \omega out$$

Therefore, the driving frequency f can be calculated by the following expression.

$$f = -R \cdot \theta out_{-1}/Tf + R \cdot \theta in_{-1}/Tf$$

That is, the gain rm1 of the third gain part 41 is R/Tf, and the gain rm2 of the fourth gain part 42 is −R/Tf, so that the multiplied results in the respective gain part 41 and 42 are added by the adder 43 to output the driving frequency f.

The driving frequency f thus calculated is inputted to the stochastic output calculating part 45 shown in FIG. 6. In the stochastic output calculating part 45, assuming that the sampling frequency of the periodic signal generating means 6 in the second preferred embodiment is fs, the quantizing part 46 calculates the non-negative integer part n of f/fs to output n×fs. On the other hand, the subtracting part 48 outputs the calculated result Δf (the absolute value of f) of −n×fs, and the comparing part 49 derives a rate h of the Δf to the fs, which is compared to the random number r ranging from 0 to 1 generated by the random number generating part 50. The switching part 53 outputs the fs when h>r, and 0 of the constant part 52b when it is not so. In the adder 54, the output of the switching part 53 is added to the output of the quantizing part 46 to output n×fs or (n+1)×fs. The output of the adding part 54, to which the direction is added by the sign calculating part 55 on the basis of the sign of the frequency f, is introduced into the pulse generator 9 via the switching part 58. The pulse generator 9 generates pulses at a frequency of the output of the sign calculating part 55, and outputs a given signal to the drive amplifier 5 so as to rotate the rotating shaft 12b of the stepping motor 12 counterclockwise when the output of the sign calculating part 55 is positive and so as to rotate the rotating shaft 12b clockwise when the output of the sign calculating part 55 is negative. Thus, through the driving amplifier 5, the stepping motor 12 is controlled so as to damp the vibration of the paddle 13. When the vibration is controlled so that the θ1 and ω1 remain being smaller than δ and δ' for a predetermined period of time, the comparing part 56 sets the switching part 58 to the NO side to select zero of the constant part 57, so that zero is outputted to the pulse generator 9 to stop the stepping motor 12 to end the control. That is, the frequency command value calculated on the basis of the θ1 and ω1 approaches zero within a predetermined error range, and this state continues for a predetermined period of time or more by the damping control, so that the periodic signal is zero to complete the damping.

By the way, when the sampling frequency fs is 100 Hz and when the output frequency f of the digital control calculating part 20 is 120 at a point of time, one and one-sixth cycles of a pulse signal having a period of 8.33 ms exist in a control period of 10 ms. Originally, if two cycles of a pulse signal having a period of 8.33 ms are generated, the stepping motor 12 is driven at 120 Hz. However, since the control period is 10 ms, the generation of a pulse with respect to the frequency f at the time of the next sampling is started at the position corresponding to one and one-sixth cycles of the pulse signal. Then, since the pulse signal has two high-voltage portions in the control period, the stepping motor 12 is actually driven at 200 Hz. As a result, the output frequency f of the digital control calculating part 20 is different from the driving actual frequency, so that the damping control of the paddle 13 is obstructed. However, according to this second preferred embodiment, since the stochastic output calculating part 45 outputs a pulse of 200 Hz at a probability of 20% and a pulse of 100 Hz at a probability of 80%, the stepping motor 12 is driven at 120 Hz as a whole.

Figure 7:
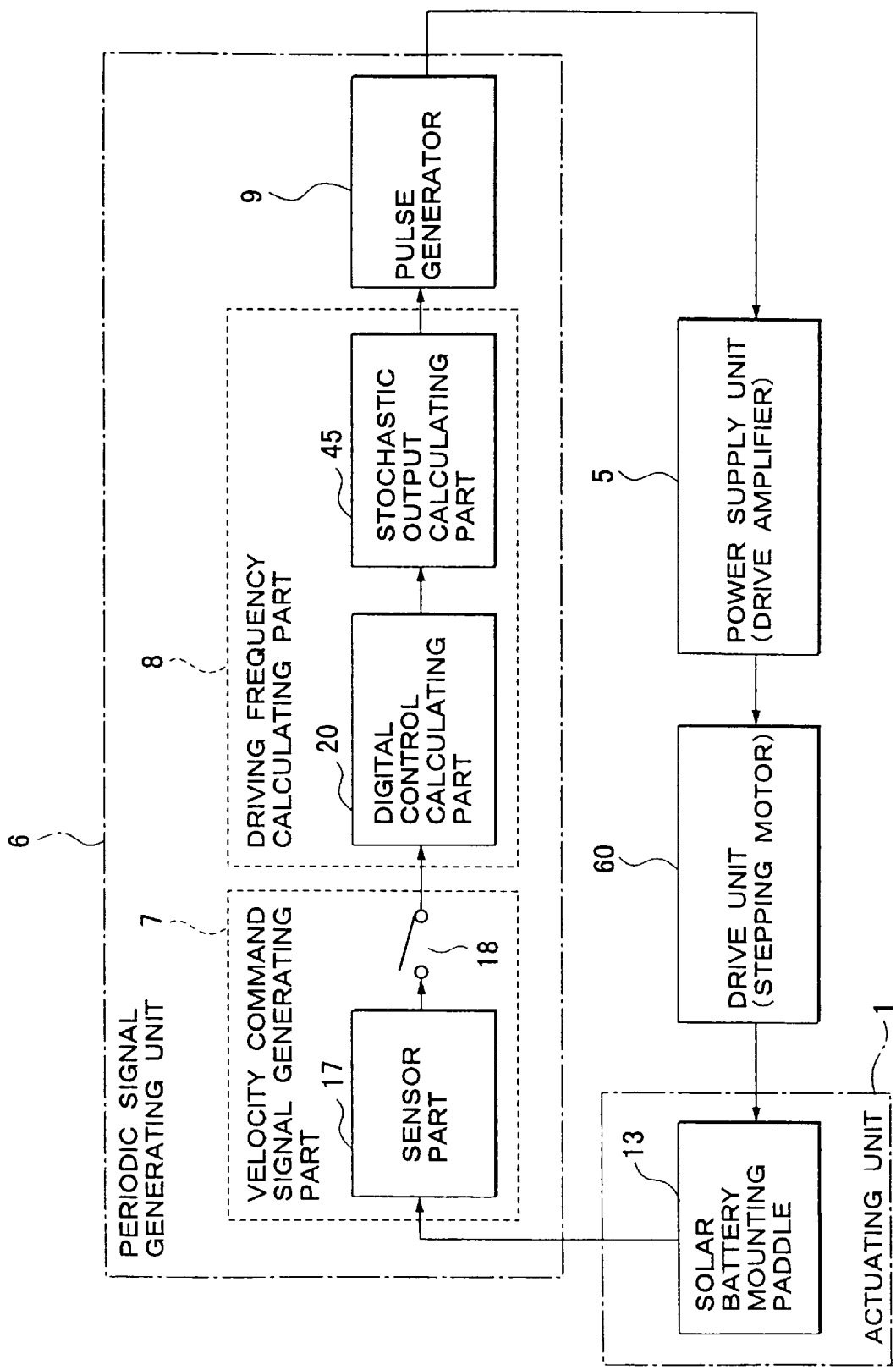
FIG. 7 is a block diagram of the third preferred embodiment of a periodic signal drive system according to the present invention.
Figure 8:
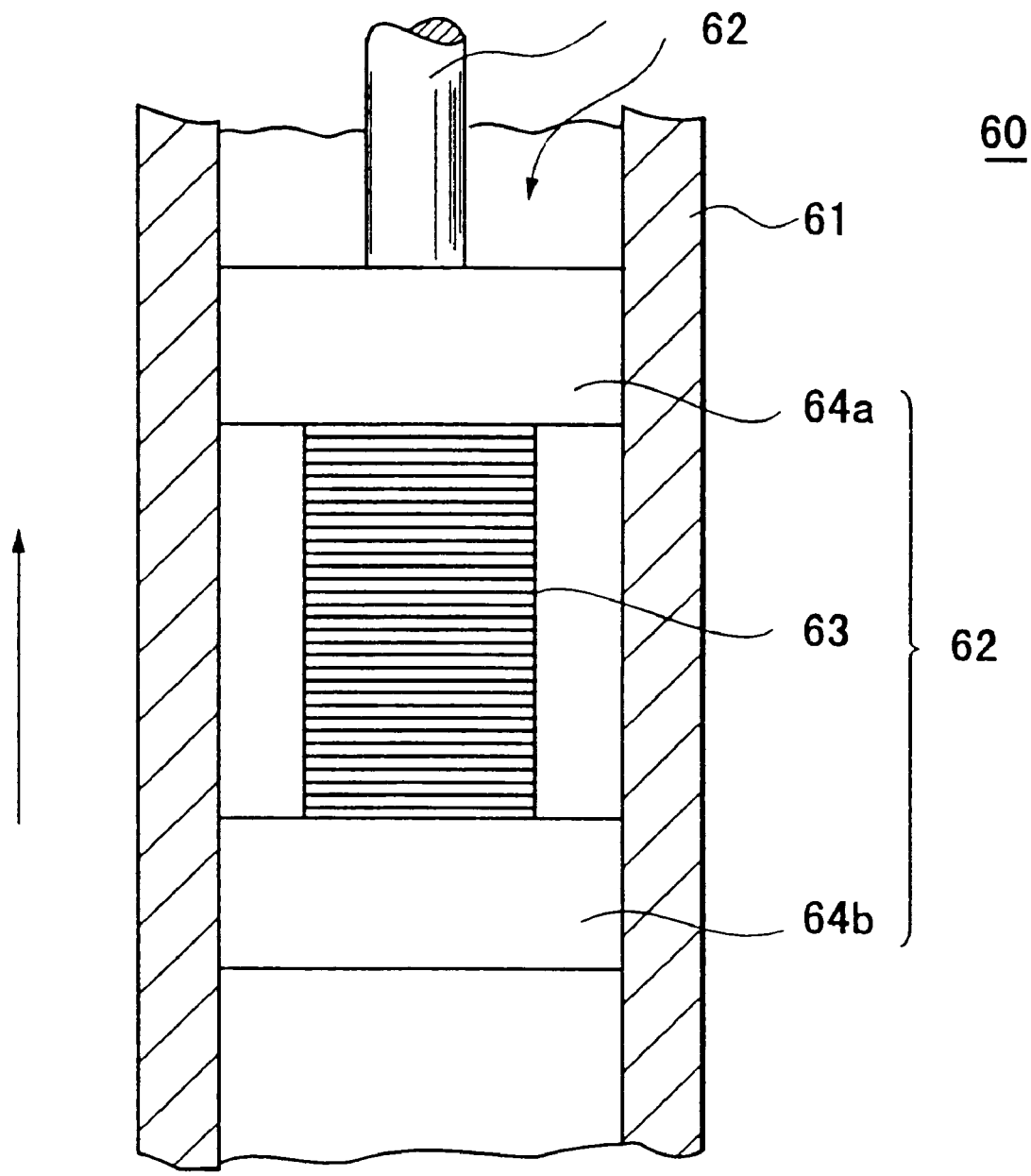
FIG. 8 is a schematic sectional view of a piezoelectric element actuator, to which the third preferred embodiment of a periodic signal drive system according to the present invention is applied.
Figure 9:
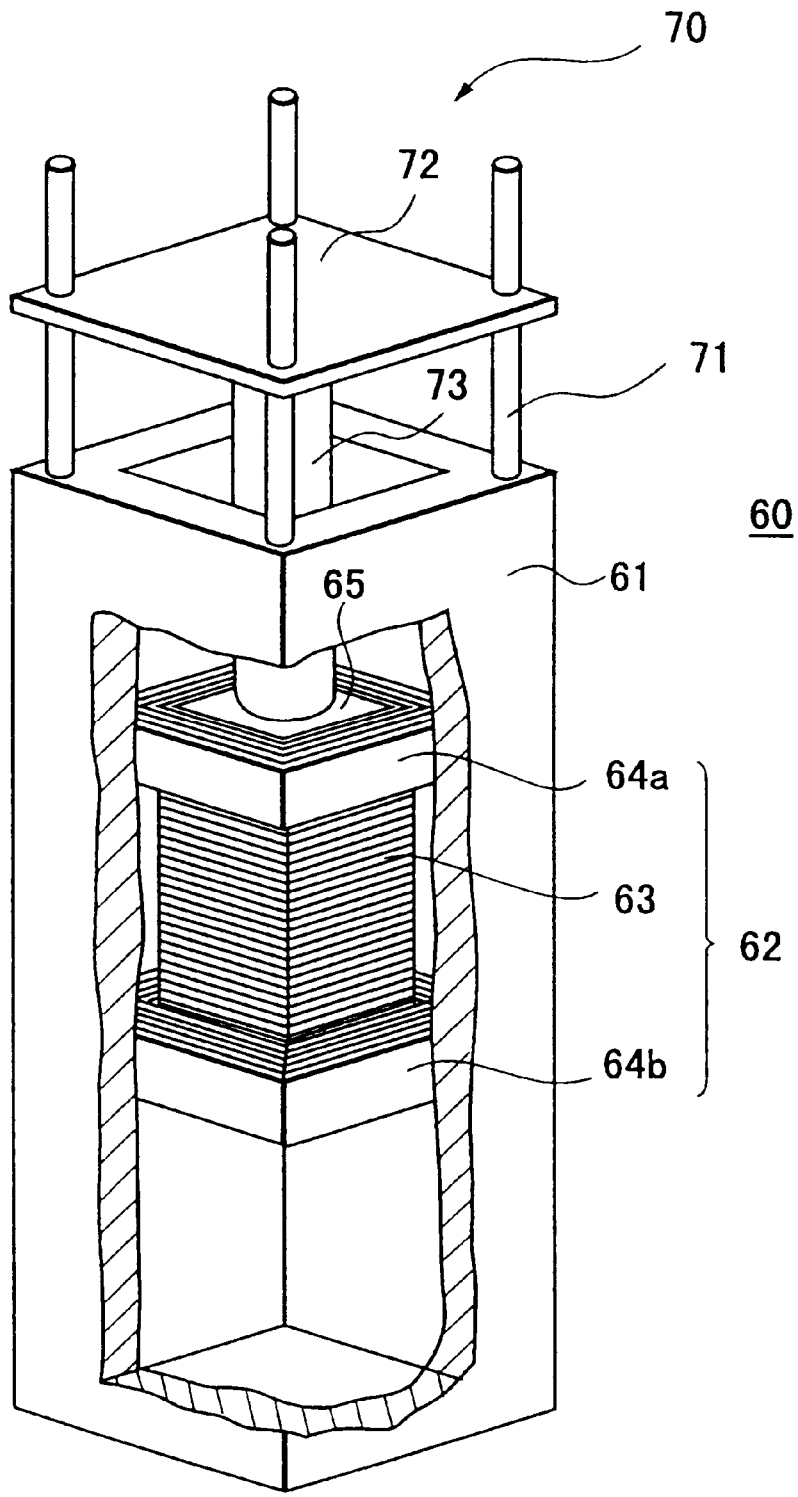
FIG. 9 is a perspective view of an active suspension, to which the piezoelectric element actuator of FIG. 8 is applied.

Furthermore, the present invention should not be limited to the first and second preferred embodiments. In the second preferred embodiment, while the damping device has used the stepping motor 12, which rotates by a predetermined amount by one cycle of pulse signal, as the actuator having the fixed portion 12a and the movable portion 12b, the kind of the periodic signal generated by the periodic signal drive system, the kind of the actuator and the kind of the object to be controlled by the actuator should not be limited to those in the second preferred embodiment. As shown in FIGS. 7 through 9, the third preferred embodiment of a periodic signal drive system according to the present invention may be applied.

In FIG. 7 showing the third preferred embodiment of a periodic signal drive system according to the present invention, the same reference numbers are used for the same elements as or corresponding elements to those of the periodic signal drive system in the second preferred embodiment shown in FIG. 3, and the repeated descriptions thereof are omitted. In FIG. 7, driving means comprises a piezoelectric element actuator 60 as shown in FIGS. 8 and 9, not the stepping motor as shown in FIG. 3. In addition, the actuating unit 1 comprises an active suspension 70 which will be described later.

In FIG. 8, the piezoelectric element actuator 60 comprises a rectangular pipe 61 serving as a fixed portion, and a piezoelectric moving element 62 serving as a movable portion. The piezoelectric moving element 62 comprises: a piezoelectric element portion 63, which is laminated in longitudinal directions of the rectangular pipe 61 and which expands in a lamination direction when a voltage is applied thereto; a piezoelectric element portion 64a, which is mounted on one end of the piezoelectric element portion 63 to expand when a voltage is applied thereto and both ends of which contact the inner surfaces of the rectangular pipe 61 facing each other; and a piezoelectric element portion 64b, which is mounted on the other end of the piezoelectric element portion 63 to expand when a voltage is applied thereto and both ends of which contact the inner surfaces of the rectangular pipe 61 facing each other. The piezoelectric element portions 64a and 64b has a mounting portion 65 for mounting the piezoelectric element portion 63 at the central portion thereof.

When one cycle of signal is inputted to a drive amplifier 5, a voltage is applied to the piezoelectric moving element 62 by means of the drive amplifier 5 as follows. That is, a voltage has been applied to the piezoelectric element portion 64b (64a) in the initial state, and the piezoelectric element portion 64b (64a) of the piezoelectric moving element 62 has contacted the inner surface of the rectangular pipe 61 to be supported thereon. Then, a voltage is also applied to the piezoelectric element portion 63, so that the piezoelectric element portion 63 expands in the longitudinal direction of the rectangular pipe 61. After the piezoelectric element portion 63 expands, a voltage is also applied to the piezoelectric element portion 64a (64b), so that both ends of the piezoelectric element portion 64a (64b) contact the inner surfaces of the rectangular pipe 61. Thus, the piezoelectric element portion 64a (64b) is associated with the piezoelectric element portion 64b (64a) to support the piezoelectric element portion 63 thereon.

After the piezoelectric element portion 64a (64b) expands, when the application of the voltage to the piezoelectric element portions 64b (64a) and 63 is stopped, the piezoelectric element portion 63 shortens, so that the position of the piezoelectric element portion 64b (64a) moves by a predetermined amount in the direction of arrow (opposite direction) in FIG. 8. Then, in order to support the piezoelectric moving element 62, a voltage is applied to the piezoelectric element portion 64b (64a) again. Thereafter, the application of the voltage to the piezoelectric element portion 64a (64b) is stopped, the driving operation of the drive amplifier by one cycle of the input signal is completed.

The piezoelectric element actuator 60 serving as a periodic signal drive system is built in, e.g., an active suspension 70 shown in FIG. 9. The active suspension 70 comprises: the piezoelectric element actuator 60 serving as the periodic signal drive system; four supporting guides 71 of round bars, which are fixed to the upper end portion of the rectangular pipe 61 of the actuator 60 at the four corners thereof; a pedestal 72 supported on the supporting guides 71 so as to be capable of reciprocating; and an elastic member 73, one end of which is fixed to the lower surface of the pedestal 72 and the other end of which is fixed to the upper surface of the piezoelectric element portion 64a (64b) of the piezoelectric element actuator 60.

Each of the cylindrical supporting guides 71 is a conductive member having a predetermined electric resistance. The position of the pedestal 72 with respect to the rectangular pipe 61, which can be regarded as the fixed portion of the actuator, can be detected by measuring the electric resistance between the upper end of the supporting guide 71 and the central portion of the pedestal 72.

Figure 10:
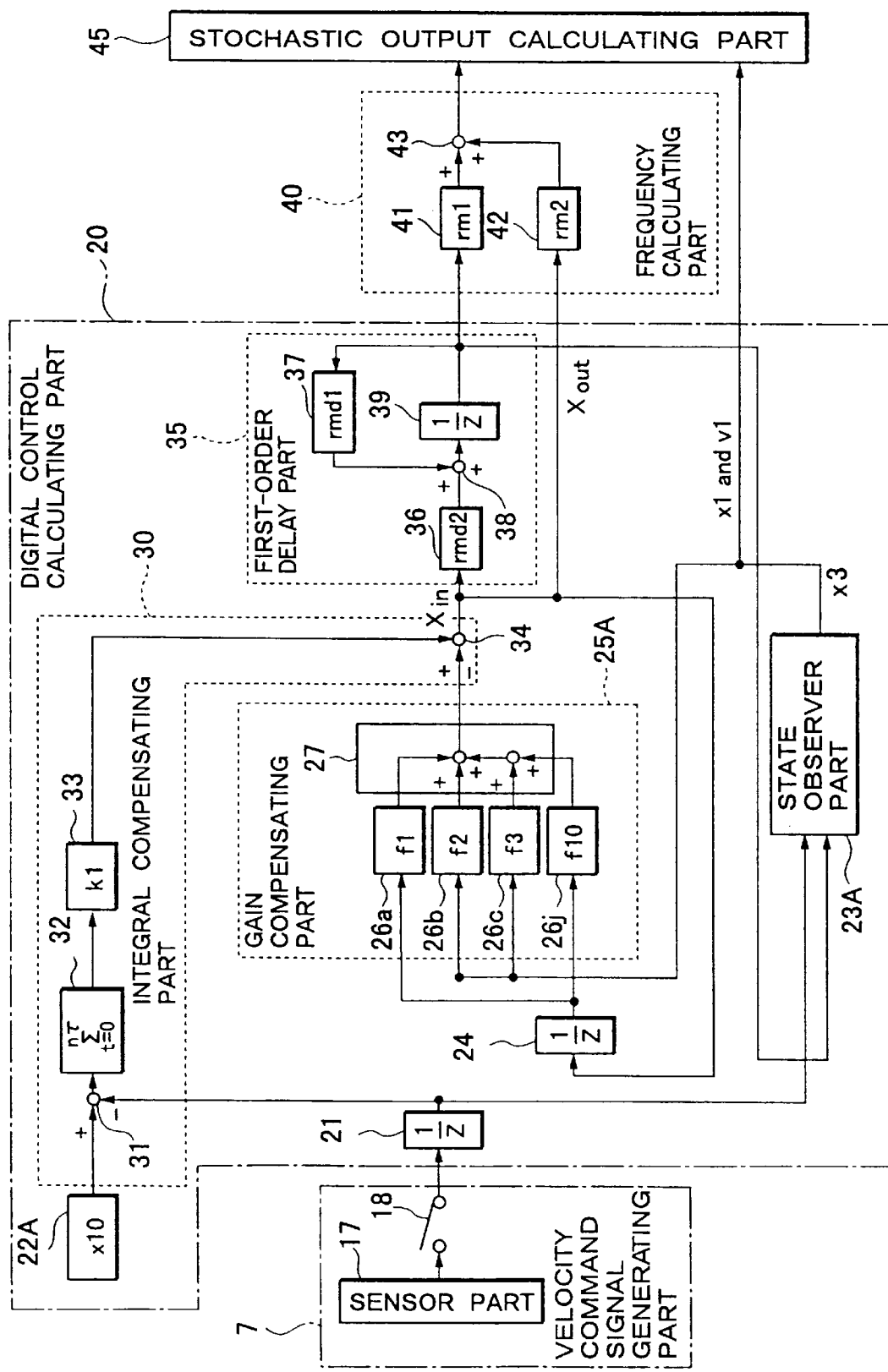
FIG. 10 is a block diagram of a digital control calculating part of FIG. 7.

The sensor part (not shown in FIG. 9) of the active suspension 70 detects the relative position x of the pedestal 72 to the rectangular pipe 61 on the basis of the electric resistance between the four supporting guides 71 and the pedestal 72. The digital control calculating part 20 is formed as shown in FIG. 10. In FIG. 10, the same reference numbers are used for the same portions as or corresponding portions to those in the second preferred embodiment shown in FIG. 4, and the repeated descriptions thereof are omitted. In the digital control calculating part 20 in the third preferred embodiment, the construction of a gain compensating part 25A is different from that in the second preferred embodiment. In the third preferred embodiment, the gain compensating part 25A of the digital control calculating part 20 comprises four gain compensators 26a through 26c and 26j.

The digital control calculating part 20 of the active suspension 70 comprises, a digital delay module 21, a target value generating part 22A for outputting a target value xtO at a position x of the pedestal 72, a state observer part 23A, a digital delay module 24, a gain compensating part 25A, an integral compensating part 30, a first-order delay part 35 and a frequency calculating part 40.

The state observer 23A receives the position $x_{-1}$ of the pedestal 71 and the relative position $x0_{-1}$ of the piezoelectric moving element 62 with respect to the rectangular pipe 61, and outputs the values of the position $x_{-1}$ of the pedestal 72, the moving velocity $v_{-1}$ and the position $x0_{-1}$ of the piezoelectric moving element 62. Out of these outputs, the $x_{-1}$ is a measured value, the $x0_{-1}$ is the output of the first-order delay module 35, and the $v_{-1}$ is a calculated estimate. In addition, the $x_{-1}$ and $v_{-1}$ are also outputted to a stochastic output calculating part 45.

The gain compensating part 25A comprises: gain compensators 26a through 26c and 26j for multiplying the position $x_{-1}$, the velocity $v_{-1}$ and the output $xin_{-1}$ of the digital delay module 24, which are the outputs of the state observer part 23A, by a predetermined gain, respectively; and an adding part 27 for calculating the sum of the outputs of the four gain compensators. Although the integral compensating part 30 has the same construction as that of FIG. 4, it is assumed herein that the output of the subtracter 34 is xin. The subtracted result xin is introduced into the gain compensating part 40 via the digital delay module 24 for outputting the value $xin_{-1}$ of the last sample as described above, and also into a first-order delay part 35 and a frequency calculating part 40. Although the first-order delay part 35 also has the same construction as that of FIG. 4, it is assumed herein that the output of the first-order delay part 35 is xout. In addition, the frequency calculating part 40 and the stochastic output calculating part 45 have the same constructions as those of FIG. 4.

The operation of the third preferred embodiment of an active suspension 70 according to the present invention will be described below.

First, when the rectangular pipe 61 vibrates in the direction of arrow in FIG. 8, this vibration is propagated to the pedestal 72 via the elastic member 73. Then, the relative position x of the pedestal 72 with respect to the rectangular pipe 61 changes by the sensor part 17. This position data x is fed to the digital delay module 21 of the digital control calculating part 20 via the sampler 18. In the digital control calculating part 20, the position $x_{-1}$ is introduced into the subtracter 31 as well as into the state observer part 23A.

In the state observer part 23A, the relative velocity $v_{-1}$ of the pedestal 72 with respect to the rectangular pipe 61 is calculated on the basis of the introduced position data $x_{-1}$, and $v_{-1}$ is introduced into the gain compensators 26b and 26c of the gain compensator 25A. On the other hand, the $x_{-1}$ which has been used for the calculation, and the $xout_{-1}$, which has been outputted from the first-order delay module 35, have been outputted to the gain compensators 26a and 26j of the gain compensating part 25A.

In the gain compensating part 25A, the output obtained by multiplying the data $x_{-1}$, $v_{-1}$, and $xout_{-1}$ introduced from the state observer part 23A by gains f1 and f10, and the output obtained by delaying the data $x_{-1}$, $v_{-1}$ and $xout_{-1}$ introduced from the state observer part 23 by means of the digital delay module 24 are added by an adder 27, and the added result is outputted to a subtracter 34 provided in the integral compensating part 30.

On the other hand, in the subtracter 31 of the integral compensating part 30, the target value $xt0_{-1}$ of the pedestal 72 is compared to the $x_{-1}$ to be introduced into the digital integrating part 32. In the digital integrating part 32, the subtracted result of the subtracting part 31 is integrated, and the integrated result is multiplied by a gain k1 by means of a gain compensator 33 to be outputted to the adder 34. In the adder 34, the output of the gain compensating part 25A is compensated to the output of the gain compensator 33 to output the subtracted result xin. This subtracted result xin is outputted to the first-order delay part 35 and the frequency calculating part 40, and also to the gain compensator 26j, which is provided in the gain compensating part 25A, as $xin_{-1}$ by means of the digital delay module 24 when the next sampling is carried out.

Thus, the target position xin of the piezoelectric moving element 62 for controlling the vibration caused in the pedestal 72 is calculated. In the third preferred embodiment, the first-order delay part 35 generates xout following the target position xin with a first-order delay, and the movement of the piezoelectric moving element 62 follows the xout, so that the loss of synchronism of the piezoelectric moving element 62 with the rectangular pipe 61 is not caused even if the xin is rapidly changed.

In the first-order delay part 35, the subtracted result $xin_{-1}$ is introduced into a first gain part 36 to be multiplied by a gain rmd2 to be outputted to an adder 38. In the adder 38, a value obtained by multiplying the value $xout_{-1}$, which is the value of xout of the last sample, by a gain rm1 by means of a second gain part 37 is added to the output of the first gain part 36 to be introduced into the digital delay module 39 to be held therein, and the value $xout_{-1}$ is outputted. This $xout_{-1}$ is introduced into the state observer part 23 as described above, and also into the frequency calculating part 40.

In the frequency calculating part 40, the driving frequency f is calculated using the introduced $xout_{-1}$ and $xin_{-1}$ as follows. That is, since the $xout_{-1}$ is a first-order delay with respect to the $xin_{-1}$, assuming that the time constant of the first-order delay is Tf, vout, which is a time differential of the xout, can be expressed as follows.

$$vout=(-\theta out+\theta in)/Tf$$

Assuming that a proportional constant is R, the following relationship is established.

$$f=R \cdot vout$$

Therefore, the driving frequency f can be calculated by the following expression.

$$f=-R \cdot xout_{-1}/Tf+R \cdot xin_{-1}/Tf$$

That is, the gain rm1 of the third gain part 41 is R/Tf, and the gain rm2 of the fourth gain part 42 is -R/Tf, so that the multiplied results in the respective gain part 41 and 42 are added by means of the adder 43 to output the driving frequency f.

The driving frequency f thus calculated is inputted to the stochastic output calculating part 45. In the stochastic output calculating part 45, it is assumed that the sampling frequency of the periodic signal generating unit 6 in the third preferred embodiment is fs, the quantizing part 46 shown in FIG. 6 calculates the non-negative integer part n of f/fs to output n×fs. On the other hand, the subtracting part 48 outputs the calculated result Δf of −n×fs (the absolute value of f), and the comparing part 49 derives a rate h of the Δf to the fs, which is compared to the random number r ranging from 0 to 1 generated by the random number generating part 50. The switching part 53 outputs fs when h>r, and 0 of the constant part 95 when it is not so. In the adder 54, the output of the switching part 53 is added to the output of the quantizing part 46 to output n×fs or (n+1)×fs. The output of the adding part 54, to which the direction is added by means of the sign calculating part 55 on the basis of the sign of the frequency f, is introduced into the pulse generator 9 via the switching part 58. The pulse generator 9 generates pulses at a frequency of the output of the sign calculating part 55, and outputs a given signal to the drive amplifier 5 so as to move the piezoelectric moving member 62 of the piezoelectric actuator 60 in the direction of arrow in FIG. 8 when the output of the sign calculating part 55 is positive and so as to move the piezoelectric moving member 62 in the opposite direction to the arrow when the output of the sign calculating part 55 is negative. Thus, through the driving amplifier 5, the piezoelectric moving member 62 is controlled so as to damp the vibration of the paddle 72.

When the vibration applied to the rectangular pipe 61 is removed, the x and v1 are smaller than predetermined values δ and δ', respectively, and the comparing part 56 sets the switching part 58 to the NO side to select zero of the constant part 57, so that zero is outputted to the pulse generator 9 to stop the piezoelectric actuator 60 to end the control. That is, the frequency command value calculated on the basis of the x1 and v1 approaches zero in a predetermined error range, and this stage continues for a predetermined period of time or more by the damping control, so that the periodic signal is zero to complete the damping.

Referring to FIGS. 11 through 15, the fourth and fifth preferred embodiments of the present invention will be described below. In these preferred embodiments, an error correcting part 75 and a frequency quantizing part 80 are substituted for the stochastic output calculating part 45 shown in FIGS. 3, 4, 6, 7 and 10. Furthermore, in FIGS. 11 through 15, the same reference numbers are used for the same elements as or corresponding elements to those of the periodic signal drive system in the first through third preferred embodiments, and only the required descriptions will be described.

First, as an example of a method for correcting a quantization error for use in error correcting means, a difference between a first continuous frequency, which is calculated by means of the digital control calculating part, and a discrete frequency, which is the output of the frequency quantizing means, may be stored in the digital delay module, and when the next sampling is carried out, a quantization error may be added to the stored quantization error and the first continuous frequency calculated by means of the digital control calculating part 20 to form a second continuous frequency to quantize the second continuous frequency again.

Figure 11:
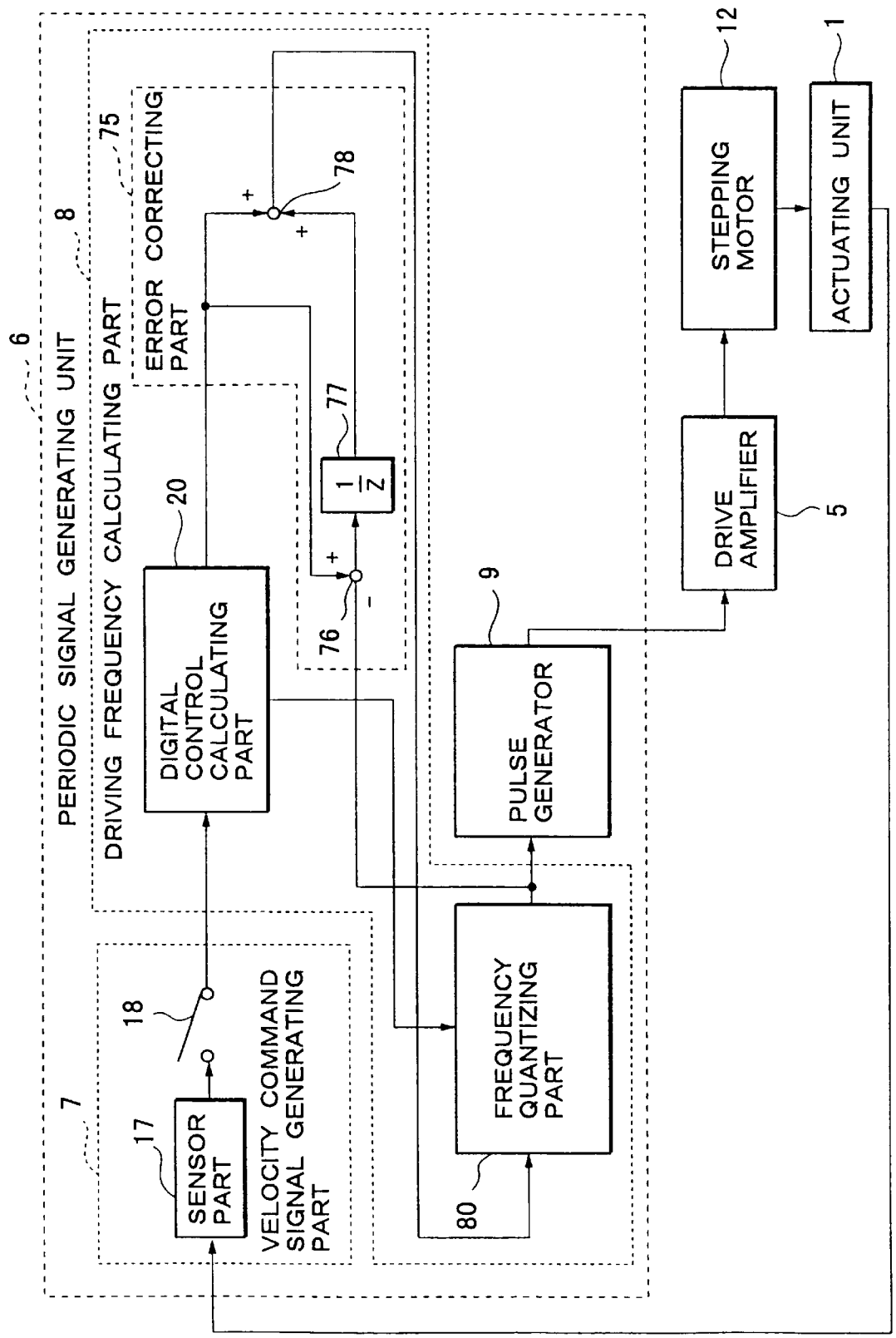
FIG. 11 is a block diagram showing the functional construction of the fourth preferred embodiment of a periodic signal drive system according to the present invention.

FIG. 11 is a block diagram of a principal part of the fourth preferred embodiment of a periodic signal drive system according to the present invention. This periodic signal drive system 10 is applied to the damping device 3 for damping the solar battery mounting paddle 13 of the artificial satellite 1 of FIG. 2 in the first preferred embodiment.

In FIG. 11 showing the fourth preferred embodiment of a periodic signal drive system according to the present invention, driving frequency calculating means 8 comprises a digital control calculating part 20, an error correcting part 75, and a frequency quantizing part 80. The digital control calculating part 20 calculates an angular velocity ω of the actuator movable portion for controlling the movement of an object to be controlled, and calculates a frequency f of a drive pulse signal for moving the actuator movable portion at the angular velocity ω. The error correcting part 75 comprises: a subtracting part 76 for calculating a difference between the continuous output frequency f of the digital control calculating part 20 and a discrete output frequency of the frequency quantizing part 80, which will be described later; a digital delay module 77 for storing a quantization error Δf, which is the subtracted result of the subtracting part 76; and an adding part 78 for adding the output frequency f of the digital control calculating part 20 to the quantization error Δf in the last sampling, which is stored in the digital delay module 77, every sampling to output a new continuous frequency f.

The frequency quantizing part 80 calculates an integer part n of f/fs on the basis of the control pulse signal frequency f, which is calculated as the new continuous frequency f in the error correcting part 75, and a sampling frequency fs, and generates a random number r ranging from 0 to 1 every sampling to compare the random number r to a numerical value ranging from 0 to 1 obtained by $|(f/fs-n)|$. As the calculated results, the frequency quantizing part 80 outputs a frequency value of "(n+sign(f)×1)×fs" Hz when r≦h, and a frequency value of "n×fs" Hz when r>h. The calculated results outputted from the frequency quantizing part 80 are introduced into the pulse generator 9 to drive the stepping motor 12 via the drive amplifier 5 to damp the vibration of the movable portion 3 (the paddle 13) of the actuating unit 1. As described above, the output of the frequency quantizing part 80 is also introduced into the error correcting part 75 to correct the quantization error.

Figure 12:
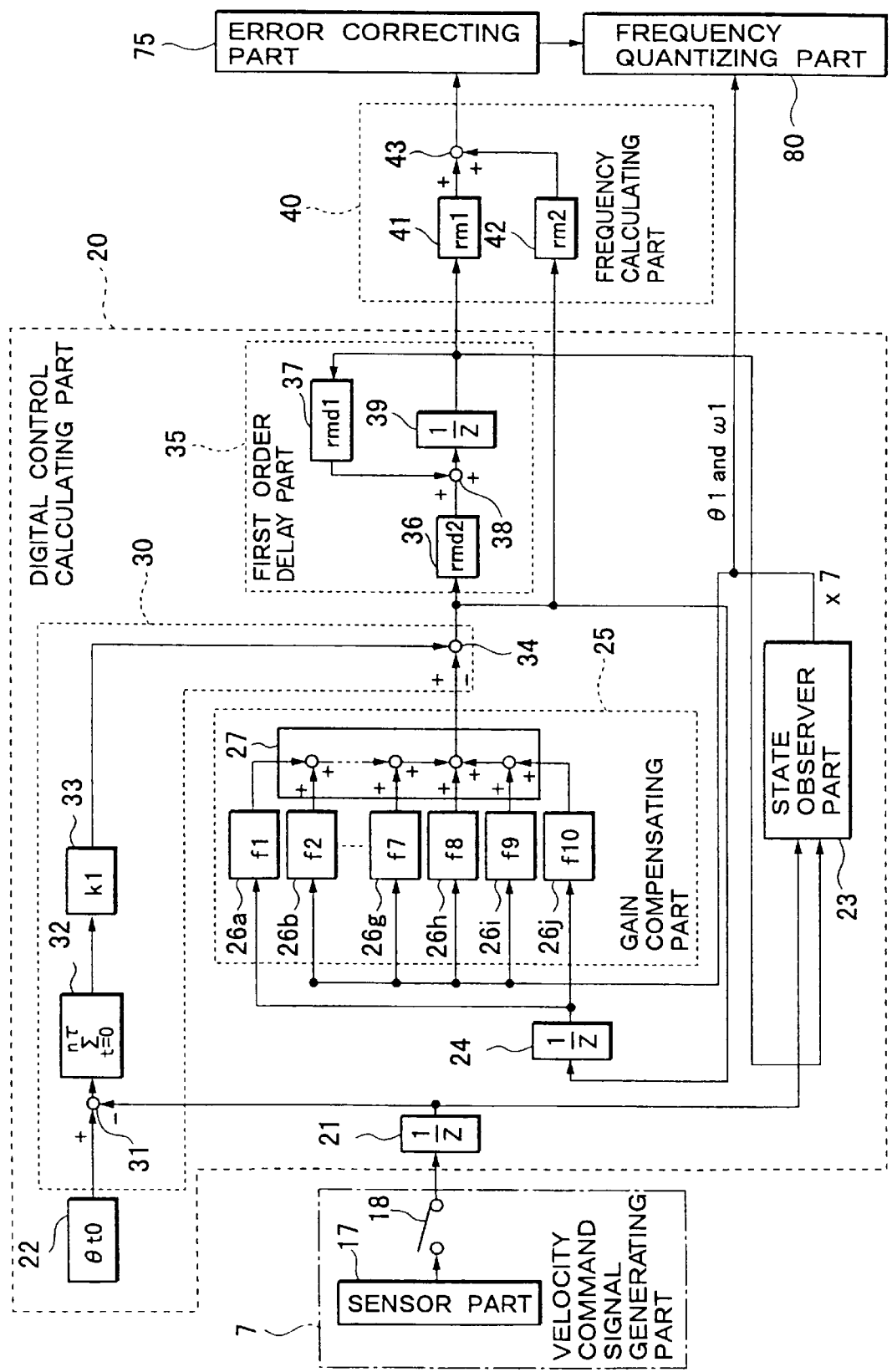
FIG. 12 is a block diagram showing the functional construction of a digital control calculating part of the fourth preferred embodiment of a periodic signal drive system according to the present invention.

Also as shown in FIG. 12, the digital control calculating part 20 of the damping device for the artificial satellite 10 shown in FIG. 2 comprises digital delay modules 21 and 24, a target value generating part 22, a state observer part 23 for outputting a target value θt0 of θ1, a gain compensating part 25, an integral compensating part 30 and a first-order delay part 35. This construction is substantially the same as that of FIG. 4, except that the output of the digital control calculating part 20 is supplied to the error correcting means 75 via the frequency calculating part 40 and that the output of the state observer part 23 is supplied to the frequency quantizing part 80. In FIG. 4, these outputs have been inputted to the stochastic output calculating part 45.

Figure 13:
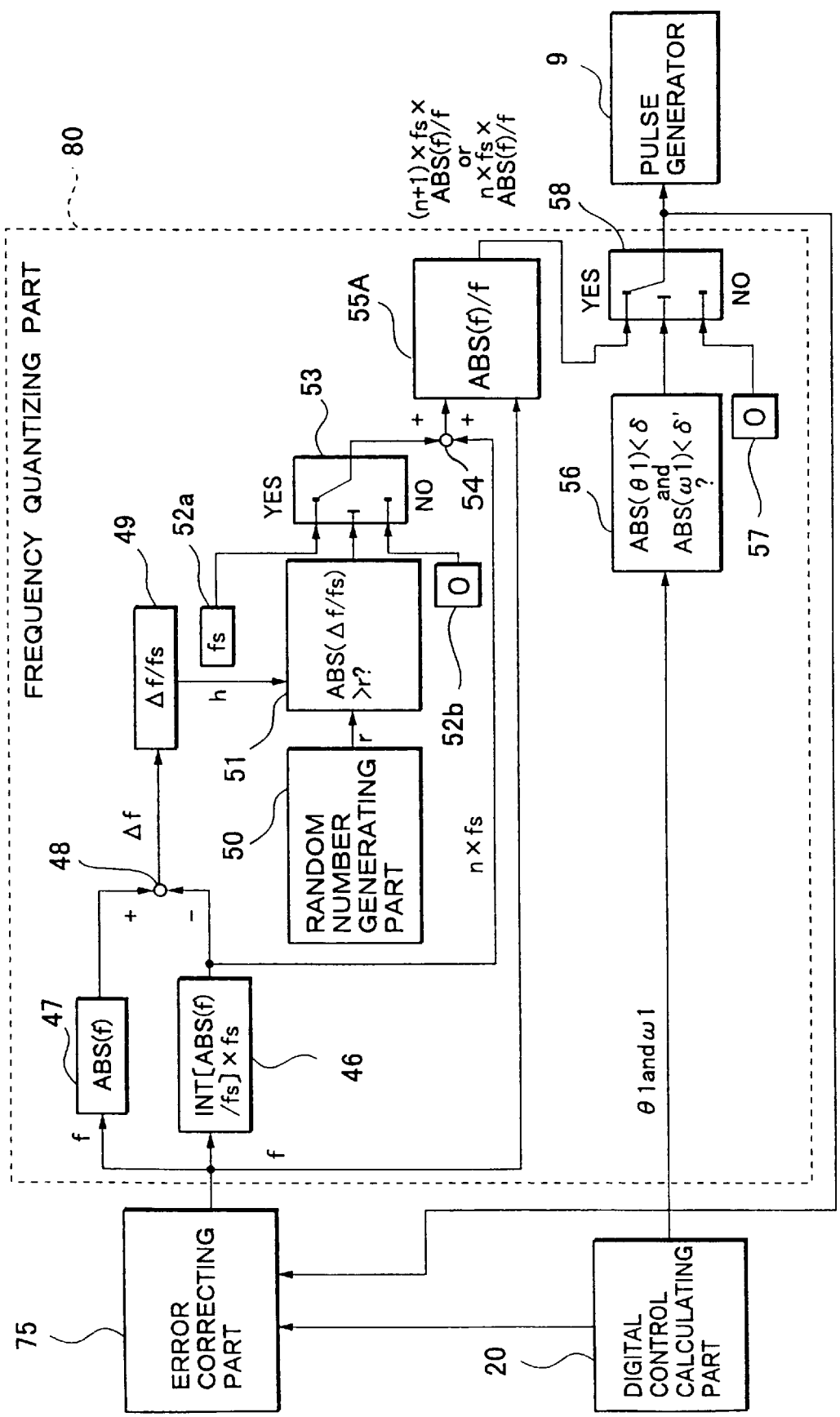
FIG. 13 is a block diagram showing the functional construction of a stochastic output calculating part of the fourth preferred embodiment of a periodic signal drive system according to the present invention.

The frequency quantizing part 80 is formed as shown in FIG. 13. Since the construction of the frequency quantizing part 80 is substantially the same as that of the stochastic output calculating part 45 of the periodic signal drive system in the first preferred embodiment shown in FIG. 6, the same reference numbers are used for the same portions to omit the repeated descriptions thereof. The differences between the frequency quantizing part 80 and the stochastic output calculating part 45 are as follows. In FIG. 6, the frequency f is inputted from the digital control calculating part 20 via the frequency calculating part 40 (not shown in FIG. 6). On the other hand, in FIG. 13, the frequency f calculated by the frequency calculating part 40 (not shown) is inputted from the digital control calculating part 20 via the error correcting part 75. In addition, the output of the switching part 58 is not only fed back to the pulse generator 9, but also to the error correcting means 75. Since other constructions are the same as those of FIG. 6, the repeated descriptions thereof are omitted.

Thus, according to the actuator controller using a periodic signal in the fourth preferred embodiment, the error of the quantized driving frequency is corrected every sampling, so that it is possible to realize control performance as if a pulse drive actuator, such as a stepping motor, is digitally controlled at an optional continuous frequency.

Figure 14:
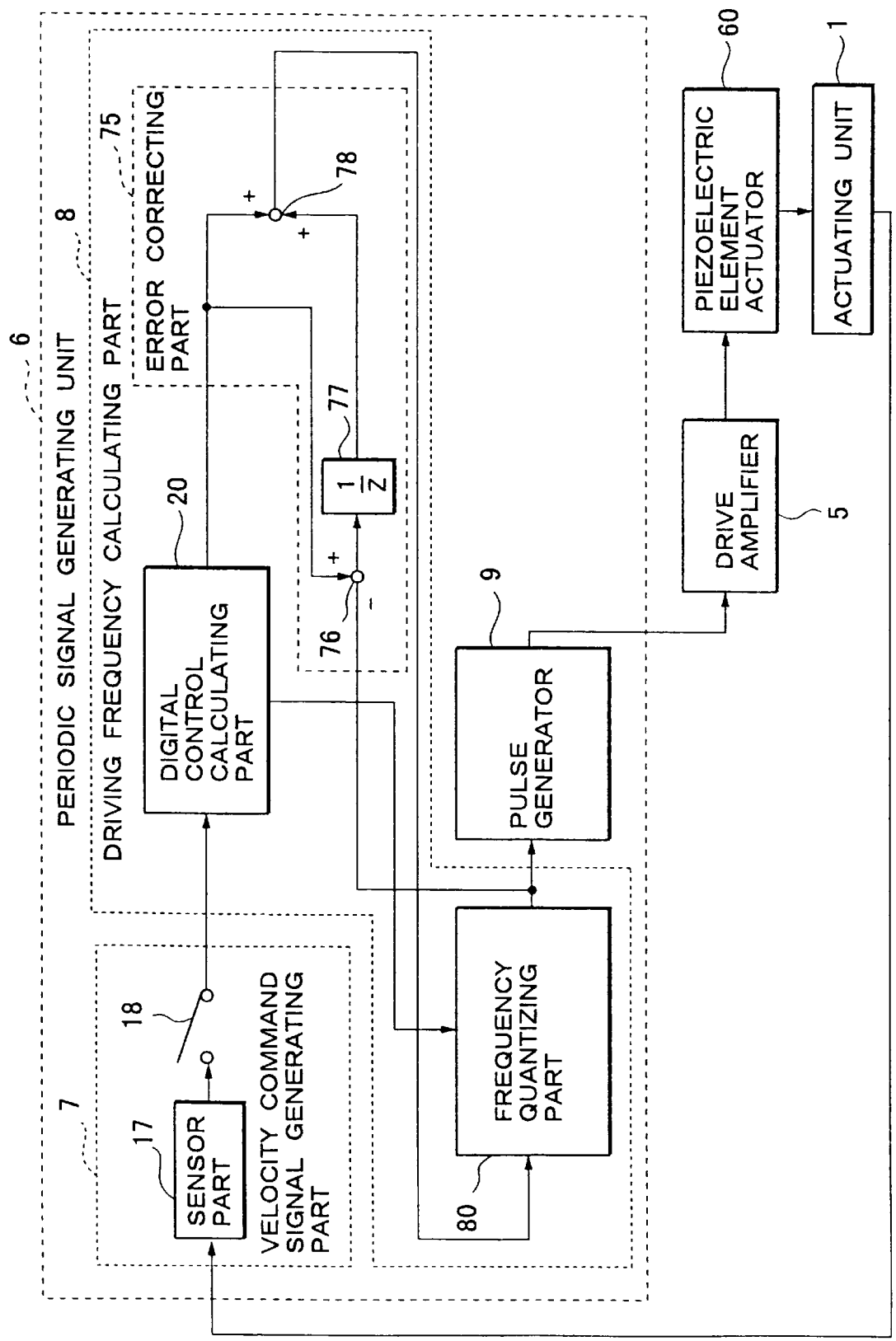
FIG. 14 is a block diagram of the fifth preferred embodiment of a periodic signal drive system according to the present invention.

Furthermore, the construction for controlling the continuous frequency should not be limited to the fourth preferred embodiment, but the same advantages can be obtained by the following modifications. For example, in the fourth preferred embodiment, the stepping motor for rotating the movable portion by a predetermined amount by means of one cycle of pulse signal has been used as the actuator having the fixed portion and the movable portion to form the damping device. However, the kinds of the periodic signal and the actuator and the objects to be driven by the actuator of the actuator controller using a periodic signal should not be limited to those in the fourth preferred embodiment. As shown in FIG. 14, the fifth preferred embodiment of an actuator controller using a periodic signal according to the present invention may be used.

In the actuator controller using a periodic signal shown in FIG. 14, the stepping motor 12 and the accompanying drive amplifier 5 of the periodic signal drive system in the fourth preferred embodiment shown in FIG. 11 are substituted for the piezoelectric element actuator 60 and the accompanying drive amplifier 5 shown in FIG. 8. Furthermore, in FIG. 14, the same reference numbers are used for the same elements as those of FIG. 11 to omit the repeated descriptions thereof. The construction of the piezoelectric element actuator 60 shown in FIG. 14 is the same as that shown in FIG. 8, and the construction of the active suspension, in which the piezoelectric element actuator 60 is built, is the same as that of the active suspension 70 shown in FIG. 9. Since the constructions and operations of the piezoelectric element actuator 60 of FIG. 8 and the active suspension 70 of FIG. 9 are the same as those in the third preferred embodiment, the repeated descriptions thereof are omitted.

In addition, since the construction and operation of a periodic signal generating unit 6 shown in FIG. 14 is the same as those of the periodic signal generating unit 6 in the fourth preferred embodiment shown in FIG. 14, the repeated descriptions thereof are omitted.

Figure 15:
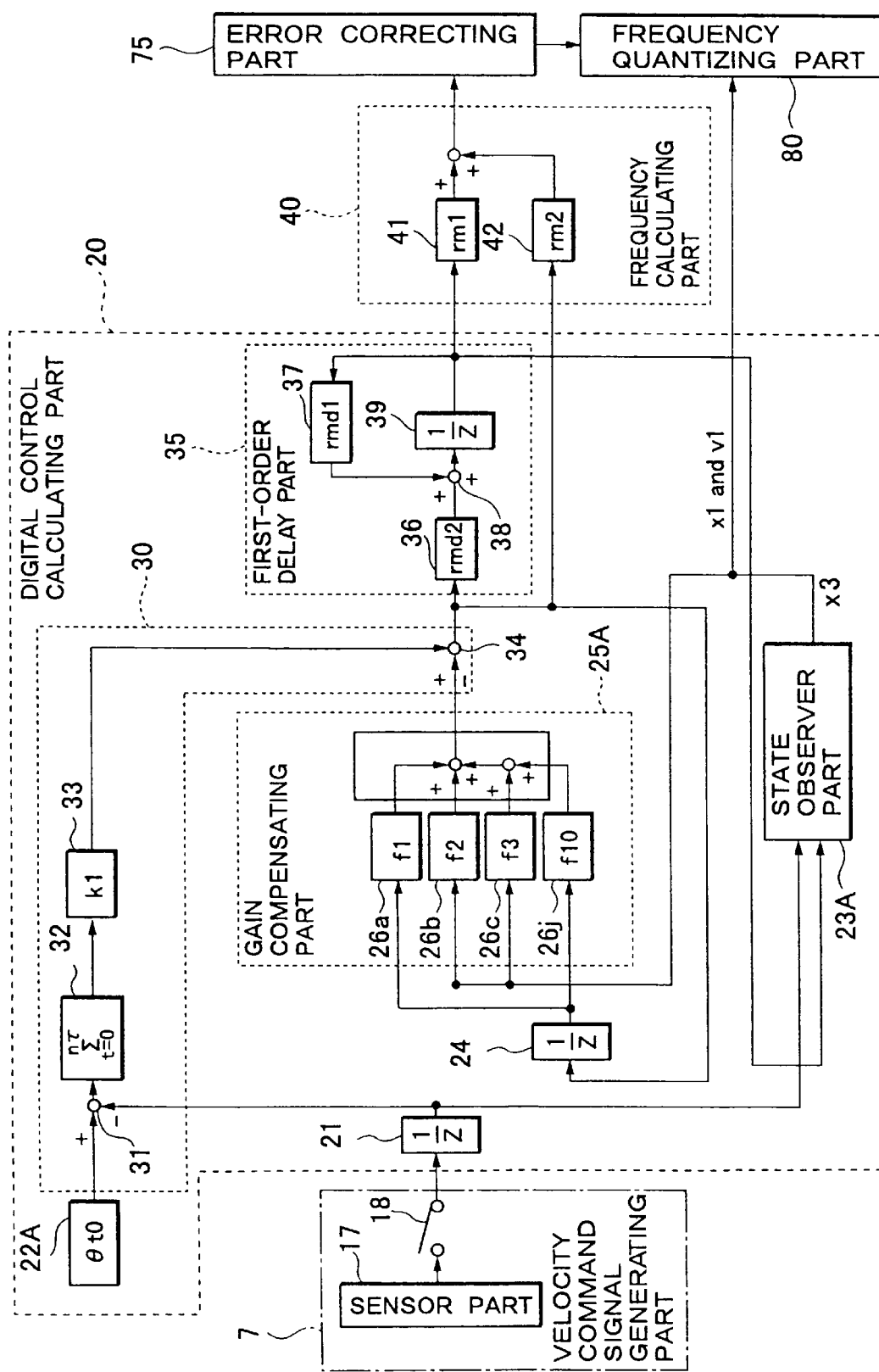
FIG. 15 is a block diagram showing the functional construction of a digital control calculating part of the fifth preferred embodiment of a periodic signal drive system according to the present invention.

As shown in FIG. 15, the digital control calculating part 20 of FIG. 14 comprises two digital delay modules 21 and 24, a target value generating part 22A, a state observer part 23A, a gain compensating part 25A, an integral compensating part 30, and a first-order delay part 35. The input and output of the first-order delay part 35 are inputted to the frequency calculating part 40. Since the construction of the digital control calculating part 20 of FIG. 15 is the same as that in the third preferred embodiment, the repeated description thereof is omitted. In addition, although the output of the state observer part 23A is inputted to the stochastic output calculating part 45 in FIG. 10, this is inputted to frequency quantizing means 80 in this fifth preferred embodiment. Since the constructions and operations of an error correcting part 75 and a frequency quantizing part 80 are the same as those of the actuator controller using a period signal in the fourth preferred embodiment, the repeated descriptions thereof are omitted.

A second continuous driving frequency f outputted from the error correcting part 75 is inputted to the frequency quantizing part 80. Assuming that the sampling frequency of the periodic signal generating unit 6 in this fifth preferred embodiment is fs, the frequency quantizing part 80 carries out the same operation as that of the frequency quantizing part 80 in the fourth preferred embodiment shown in FIG. 13. That is, in FIG. 13, the quantizing part 46 calculates a non-negative integer part n of f/fs to output n×fs. On the other hand, the subtracting part 48 outputs the calculated result Δf (the absolute value of f) of −n×fs, and the comparing part 49 derive a rate h of the Δf to the fs. The comparing part 51 compares this to a random number r ranging from 0 to 1 generated by the random number generating part 50.

The switching part 53 outputs fs of the constant part 52*a* when h>r in the compared result, and 0 of the constant part 52*b* when it is not so. The adding part 54 adds the output of the switching part 53 to the output of the quantizing part 46 to output n×fs or (n+1)×fs. Then, the output of the adding part 54, to which the direction is added by the sign calculating part 55A on the basis of the sign of the frequency f, is introduced into the pulse generator 9 and the error correcting means 75 via the switching part 58.

Thus, a predetermined signal is outputted to the drive amplifier 5 so as to move the piezoelectric moving element 63 of the piezoelectric element actuator 60 in the direction of arrow in FIG. 8 when the output of the sign calculating part 55A is positive and in the opposite direction to the arrow when is negative, so that the piezoelectric moving element 63 is controlled via the drive amplifier 5 so as to damp the vibration of the pedestal 72 of FIG. 9. When the vibration applied to the rectangular pipe 61 is removed, the target position signal x1 and v1 are smaller than predetermined values δ and δ', respectively, and zero of the constant part 57 is selected so that the comparing part 56 causes the switching part 58 to be the NO side. Therefore, zero is outputted to the pulse generator 9 to stop the piezoelectric element actuator 60 to end the control.

That is, the frequency command value calculated on the basis of the target position signals x1 and v1 approaches zero within a predetermined error range, and this state continues for a predetermined period of time or more by the damping control, so that the periodic signal is zero to complete the damping.

Figure 16:
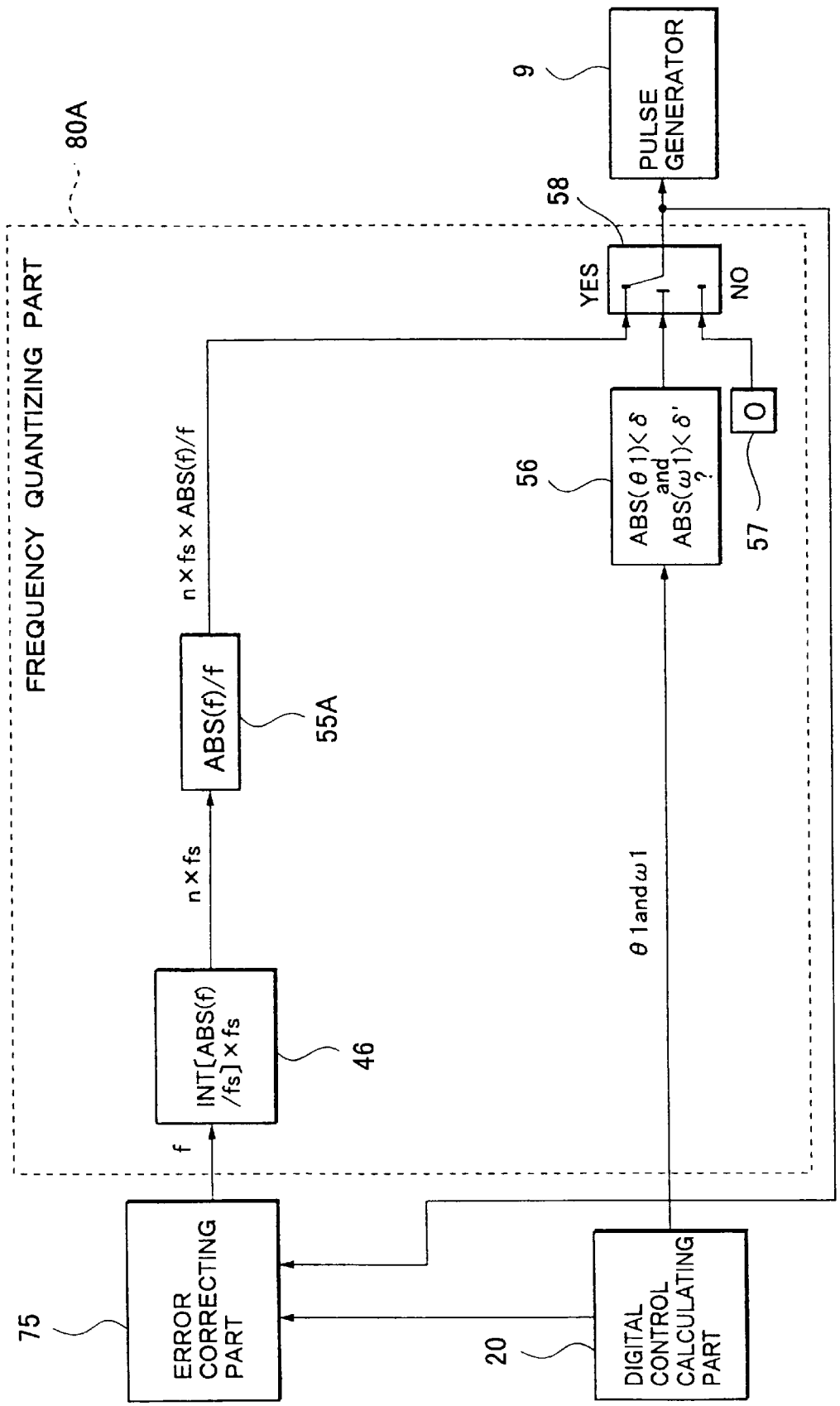
FIG. 16 is a block diagram showing the functional construction of frequency quantizing means of the sixth preferred embodiment of a periodic signal drive system according to the present invention.
Figure 17:
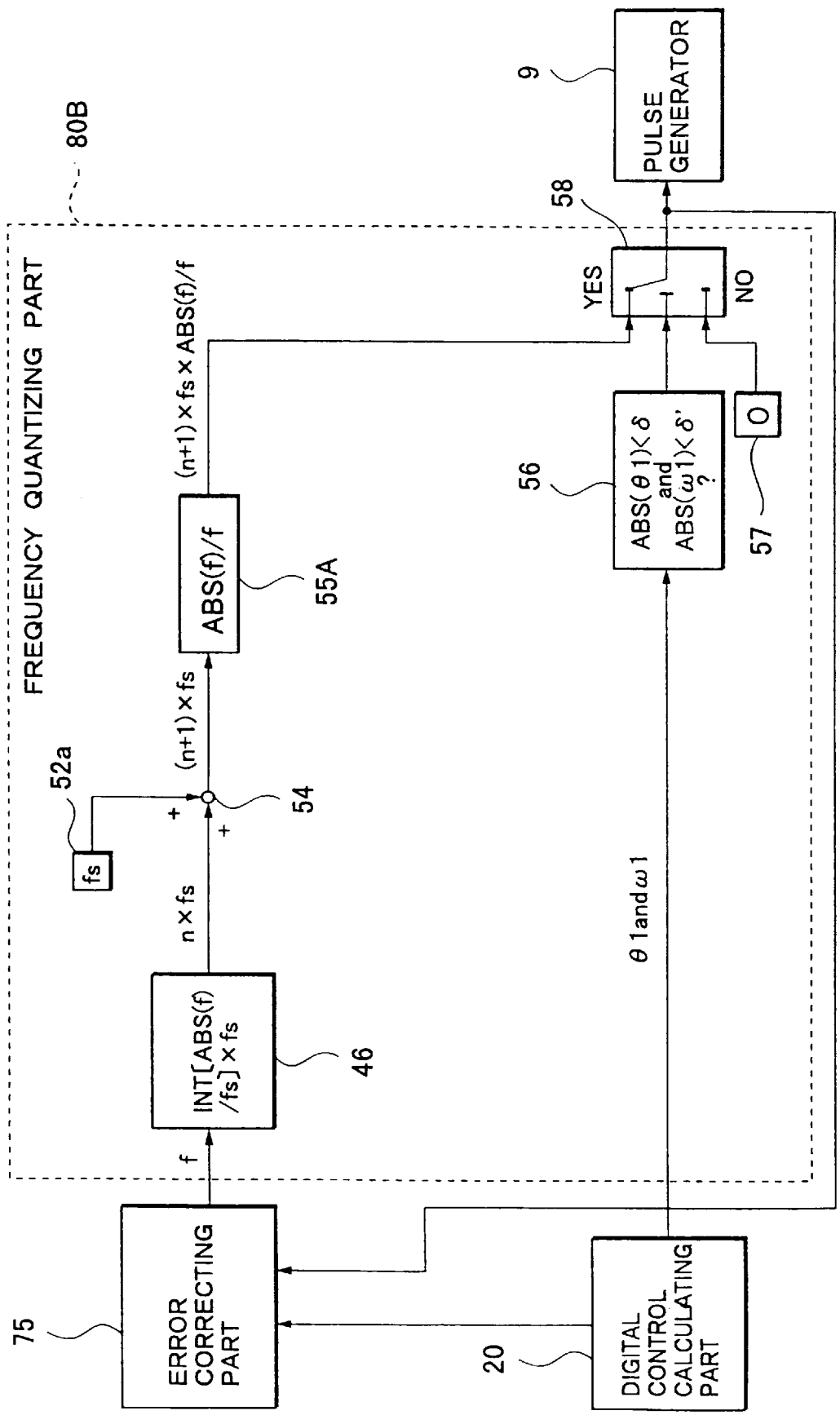
FIG. 17 is a block diagram showing the functional construction of frequency quantizing means of the seventh preferred embodiment of a periodic signal drive system according to the present invention.
Figure 18:
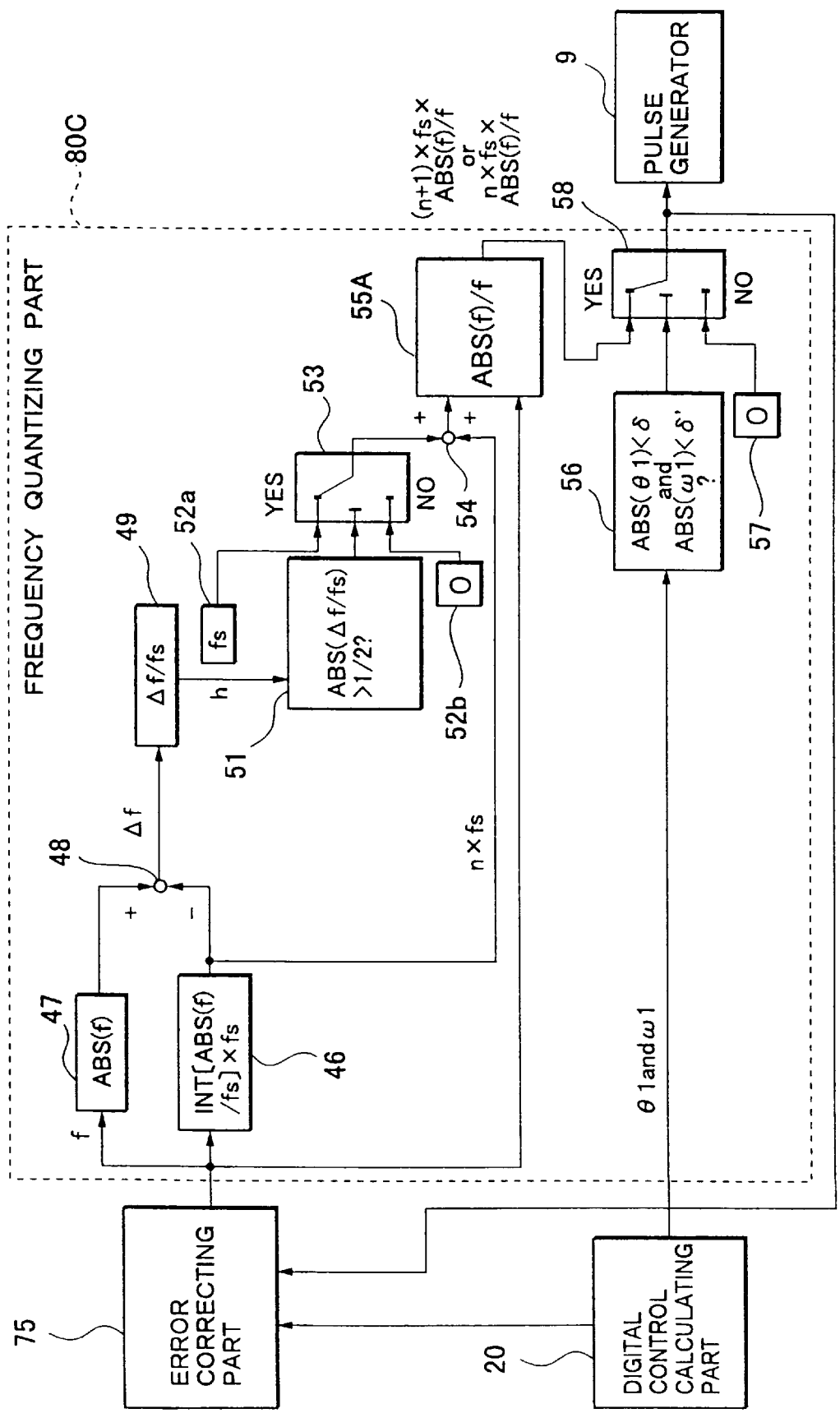
FIG. 18 is a block diagram showing the functional construction of frequency quantizing means of the eight preferred embodiment of a periodic signal drive system according to the present invention.

Moreover, in the above described preferred embodiments, while the round-down of the continuous frequency with respect to the sampling frequency has been carried out by means of the frequency quantizing means 80, the quantizing method should not be limited thereto, but any quantizing methods may be used. For example, the quantization may be carried out by the round-down as shown in FIG. 16, or by the round-up as shown in FIG. 17. Alternatively, the quantization may be carried out by the round-off as shown in FIG. 18.

In the sixth preferred embodiment of an actuator controller using a periodic signal according to the present invention, the quantization is carried out by the round-down. In this preferred embodiment, the actuator controller using a periodic signal has a frequency quantizing part 80A as shown in FIG. 16. In FIG. 16, the frequency quantizing part 80A comprises a quantizing part 46, a sign calculating part 55A, a comparing part 56, a constant part 57, and a switching part 58. Compared with the frequency quantizing part 80 of the actuator controller using a periodic signal in the fourth preferred embodiment shown in FIG. 13, the output of the sign calculating part 55A is only a frequency simplified by the round-down, so that the construction of the frequency quantizing means can be greatly simplified.

Thus, in the case of the quantization carried out by the round-down in the sixth preferred embodiment, a smaller quantization with respect to the continuous frequency is always carried out, so that the control output is small. However, since probability is not used, so that there is an advantage in that the calculating time can be decreased.

Referring to FIG. 17, the seventh preferred embodiment of an actuator controller using a periodic signal according to the present invention will be described below.

In this preferred embodiment, the actuator controller using a periodic signal comprises a frequency quantizing part 80B shown in FIG. 17. The frequency quantizing part 80B comprises: a quantizing part 46 for quantizing a frequency inputted to error correcting part 75; a contact part 52a for outputting a sampling frequency fs; an adding part 54 for adding a quantized frequency "n×fs" to the sampling frequency fs; a sign calculating part 55A for calculating a sign on the basis of the output of the adding part 54; a comparing part for comparing a position detecting signal to a predetermined value; a constant part 57 for outputting a constant "0"; and a switching part 58 for switching the outputs of the sign calculating part 55A and the constant part 57 on the basis of the comparison. In the case of such quantization carried out by the round-up, a greater quantization with respect to the continuous frequency is always carried out, so that the control output is great. However, since probability is not used, there is an advantage in that calculating time can be decreased.

Referring to FIG. 18, the eighth preferred embodiment of a periodic signal drive system according to the present invention will be described below.

In the eighth preferred embodiment, the actuator controller using a periodic signal includes a frequency quantizing part 80C shown in FIG. 18. In order to carry out the quantization by the round-off, the frequency quantizing part 80C in the eighth preferred embodiment shown in FIG. 18 has the same construction as that of the frequency quantizing part 80 of the periodic signal drive system in the fourth preferred embodiment shown in FIG. 13, except that the random number generating part 50 is not provided. In the case of the quantization carried out by the round-off, uniform quantization is carried out with respect to the continuous frequency, so that it is possible to obtain good results in comparison with the round-down and the round-up. However, similar to the frequency quantizing part 80 in the fourth preferred embodiment, the frequency quantizing part 80C includes a subtracter part 48, a rate calculating part 47, a comparing part 51, a switching part 53 and so forth, so that the calculation speed is slower than those in the sixth and seventh preferred embodiments. On the other hand, in comparison with the quantization using probability, although there is a disadvantage in that the apparent continuity of the control output value is lost, there is an advantage in that the calculating time can be decreased since probability is not used.

Moreover, in the above described preferred embodiments, while there has been provided the I-PD controller for presuming the velocity of an object to be controlled by the state observer in the digital control calculating part and for integrating the position of the object to be controlled, the digital control calculating part of the present invention should not be limited thereto, but any control methods for controlling the movement of the movable portion of the periodic signal drive system, such as feed forward control, two degree of freedom control and fuzzy control, may be used.

Also, in the above described preferred embodiments, while the blocking of the construction of the periodic signal generating unit 6 has been carried out, this only shows the functional construction, so that the actual embodiments should not be limited thereto. For example, the periodic signal generating unit 6 may comprise a program of a microcomputer or an analog circuit. The present invention can be embodied in various ways without departing from the principle of the invention.

As described above, according to the periodic signal drive system of the present invention, it is possible to smoothly control the movement of an object to be controlled (an moving object), which changes every moment, although such control can not be achieved by means of conventional periodic signal drive systems, such as a stepping motor. In addition, it is possible to provide a low power consumption type servo actuator, which utilizes the usual characteristics of periodic signal drive systems that no power is consumed to allow the object to stand still, and it is also possible to smoothly and accurately move the movable portion even if there is a little memory capacity, so that it is possible to reduce the costs of the periodic signal drive system.

Figure 19:
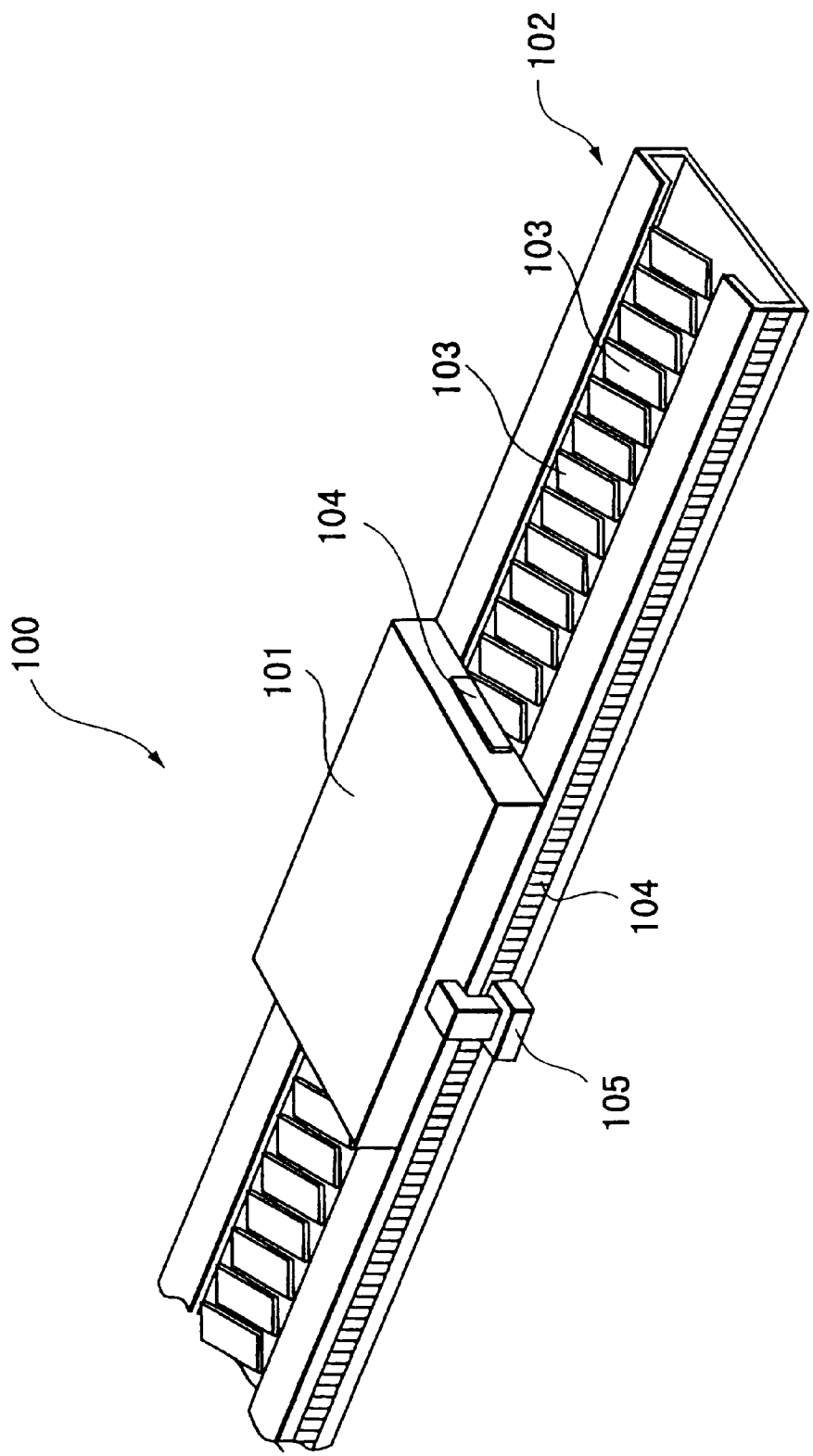
FIG. 19 is a perspective view showing a linear servo motor applying an actuator controller using a periodic signal according to the present invention.

Moreover, the actuator controller using the periodic signal according to the present invention, is applicable to a linear servo motor (LSM) system, which is used in an actuating unit of various industrial fields. In FIG. 19, a linear servo motor 100 comprises a primary member 101 as the movable portion, in which a linear synchronous motor stator 104 with three phase winding are built, and a secondary member 102 as the fixed portion, in which a plurality of plate-shaped permanent magnets 103, are attached on a ferro-magnetic plate. A linear scale 104 is mounted on the side surface of the secondary member 102, and a linear sensor 105 is mounted on the side surface of the primary member 101 corresponding to the linear scale 105. The linear scale 104 and linear sensor 105 detect a relative position of the primary member 101. Needless to say, the detailed position data refer to the velocity of the primary member 101 and magnetic flux distribution of the permanent magnets 103.

Figure 20:
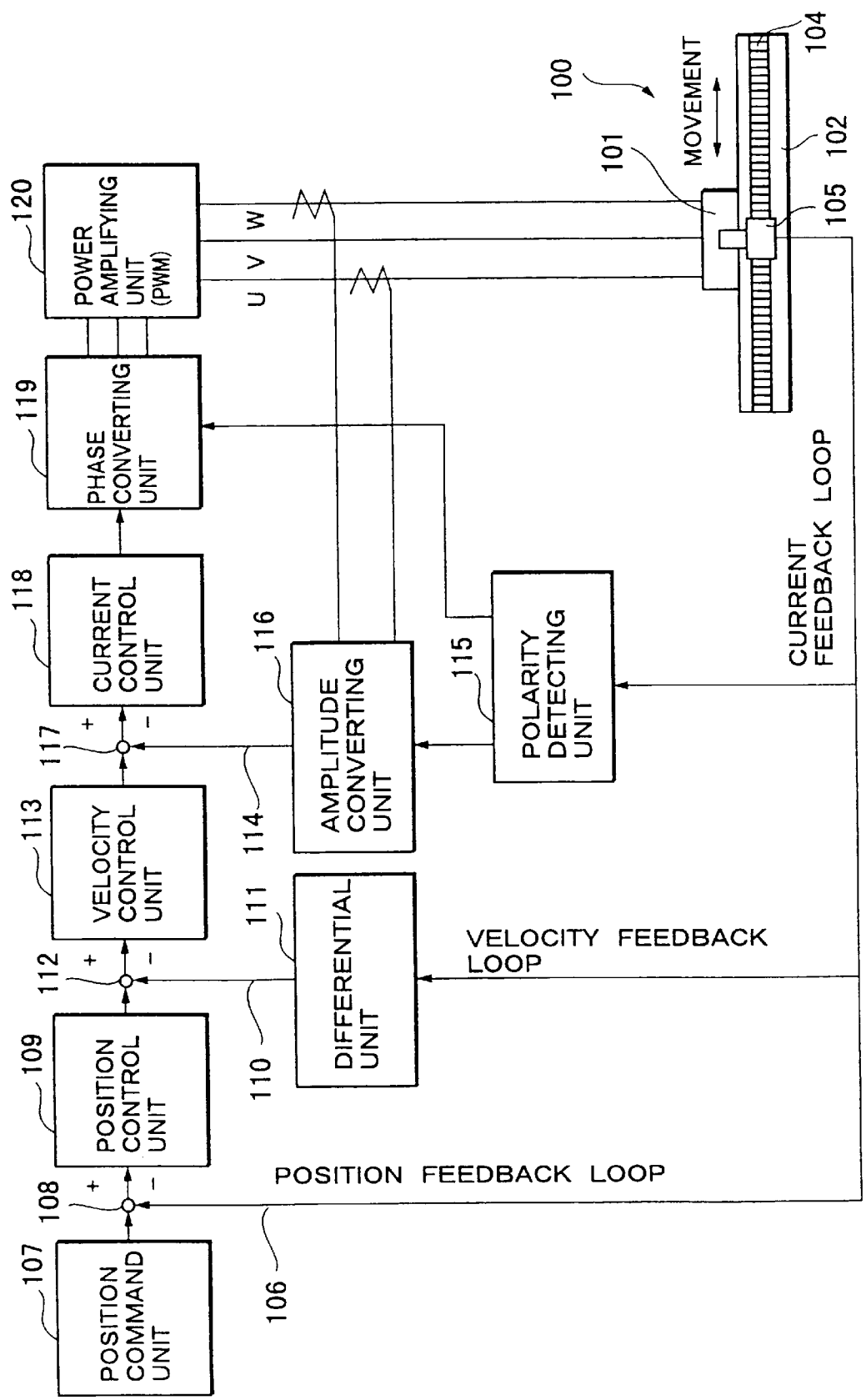
FIG. 20 is a block diagram showing a linear servo motor system for controlling the linear servomotor shown in FIG. 19.

FIG. 20 is a block diagram showing a control system for controlling the linear servo motor shown in FIG. 19. In FIG. 20, the relative position, velocity and magnetic flux detected by the linear sensor 105 are fed back to the control system through a position feedback loop 106, velocity feedback loop 110 and current feedback loop 114, respectively.

A position command outputted from a position command unit 107 is added in an adder 108 with a detected position signal which is fed back from the linear sensor 105 through the position feedback loop 106 so as to input into a position control unit 109. A position control signal outputted from the position control unit 109 is added in an adder 112 with a detected velocity signal which is fed back from the linear sensor 105 through the velocity feedback loop 110 so as to input a velocity control unit 113.

The current feedback loop 114 comprises a polarity detecting unit 115 and an amplitude converting unit 116, and an adder 117 adds a velocity control signal outputted from the velocity control unit 113 with an output of the amplitude converting unit 116 so as to input into a current control unit 118. A phase converting unit 119 inputs and converts an output of the polarity converting unit 115 and an output of the current control unit 118 into a three-phase current so as to supply to the primary member of a linear motor 100 after a power amplifying unit 120 performs a pulse width modulation (PWM).

Since the actuator controller according to the present invention can be assembled in a linear servo motor (LSM) control system as shown in FIG. 20, namely the controller is arranged before the position command unit 107 to which the controller supplies the position command such as pulse signals, it is possible to effectively apply to a control of the driving mechanism using the linear servo motor.

What is claimed is:

1. An actuator controller using a periodic signal, comprising:
   an actuating unit having a fixed portion and a movable portion;
   a drive unit for moving said movable portion with respect to said fixed portion by a predetermined amount every one cycle of a periodic signal inputted from the outside;
   a power supply unit for supplying a driving power to said drive unit; and
   a periodic signal generating unit for generating and supplying said periodic signal to said drive unit, said periodic signal generating unit comprising:
   a velocity command signal generating part for generating a velocity command signal on the basis of an output detected by said movable portion of said actuating unit, and
   a driving frequency calculating part for variably setting a frequency of said periodic signal per a predetermined period of time by a predetermined calculation in accordance with variation in said velocity command signal generated by said velocity command signal generating part.

2. An actuator controller using the periodic signal as set forth in claim 1, wherein said velocity command signal generating part generates a value, which is obtained by dividing a velocity command value of said movable portion by a predetermined moving amount of said movable portion every one cycle of said periodic signal, as a frequency command value f, and wherein said driving frequency calculating part has a stochastic output calculating part for generating a periodic signal of (n+1) cycles at a probability of (f/fs−n) and a periodic signal of n cycles at a probability of {1−(f/fs−n)} within said predetermined period of time with respect to an integer part n of f/fs, defining that an inverse number of said predetermined period of time is a predetermined frequency fs.

3. An actuator controller using the periodic signal as set forth in claim 2, wherein said stochastic output calculating part has a random number generating part for generating a random number ranging from 0 to 1, and compares a numerical value ranging from 0 to 1, which is obtained at said probability of (f/fs−n), to said random number, to generate {(n+1)×fs} pulses within a sampling period, which is said predetermined period of time, when said numerical value is greater than or equal to said random umber and to generate (n×fs) pulses within said sampling period when said random number is smaller than said numeric number.

4. An actuator controller using the periodic signal as set forth in claim 1, wherein said velocity command signal generating part generates a velocity command signal defined by the sum of a value, which is obtained by multiplying a position command signal outputted from said movable portion by a first predetermined gain, and a value, which is obtained by multiplying a first-order delay signal of said position command signal by a second predetermined gain, and wherein said driving frequency calculating part determines the frequency of said periodic signal on the basis of said velocity command signal so as to prevent the loss of synchronism of said periodic signal from occurring.

5. An actuator controller using the periodic signal as set forth in claim 4, wherein said driving frequency calculating part has a function for setting said periodic signal to be zero when the value of said frequency of said periodic signal approaches zero within a predetermined error range and when such state continues for a predetermined period of time or more.

6. An actuator controller using the periodic signal as set forth in claim 4, wherein said driving frequency calculating part stochastically determines said frequency of said periodic signal per said predetermined period of time on the basis of said velocity command signal.

7. An actuator controller using the periodic signal as set forth in claim 1, wherein said driving frequency calculating part comprises: a digital control calculating part for calculating a velocity command signal of said movable portion every said predetermined sampling period serving as said predetermined period of time to calculate a first continuous frequency of said periodic signal on the basis of said velocity command signal; an error correcting part for calculating a second continuous frequency of said periodic signal; and a frequency quantizing part for calculating a discrete frequency, which is obtained by digitizing said second continuous frequency at predetermined intervals, and wherein said error correcting part calculates said second continuous frequency for correcting a frequency quantization error on the basis of the frequency quantization error calculated by a difference between said first continuous frequency outputted from said digital control calculating part and said discrete frequency outputted from said frequency quantizing part.

8. An actuator controller using the periodic signal as set forth in claim 7, wherein said error correcting part comprises: a subtracting part for calculating said frequency quantization error defined by a difference between said first continuous frequency and said discrete frequency; a digital delay module for storing said calculated frequency quantization error; and an adding part for adding said stored frequency quantization error to said first continuous frequency to calculate said second continuous frequency.

9. An actuator controller using the periodic signal as set forth in claim 7, wherein said velocity command signal generating part generates a value, which is obtained by dividing a velocity command value of said movable portion by a predetermined moving amount of said movable portion every one cycle of said periodic signal, as a frequency command value f, and wherein said driving frequency calculating part carries out a quantization of $\pm(n+1)\times fs$ at a probability of $(f/fs-n)$ and a quantization of $\pm n\times fs$ at a probability of $\{1-(f/fs-n)\}$ within said predetermined period of time with respect to an integer part n of f/fs, assuming that an inverse number of said predetermined period of time is a predetermined frequency fs.

10. An actuator controller using the periodic signal as set forth in claim 9, wherein said driving frequency calculating part has a random number generating part for generating a random number ranging from 0 to 1, and compares a numerical value ranging from 0 to 1 obtained at said probability of $(f/fs-n)$ to said random number, to generate $\{(n+1)\times fs\}$ pulses within a sampling period, which is said predetermined period of time, when said numerical value is greater than or equal to said random umber, and to generate $(n\times fs)$ pulses within said sampling period when said random number is smaller than said numeric number.

11. An actuator controller using the periodic signal as set forth in claim 7, wherein said frequency quantizing part carries out a quantization of $\pm(n+1)\times fs$ with respect to an integer part n of f/fs.

12. An actuator controller using the periodic signal as set forth in claim 7, wherein said frequency quantizing part carries out a quantization of $\pm(n+1)\times fs$ with respect to an integer part n of f/fs.

13. An actuator controller using the periodic signal as set forth in claim 7, wherein said frequency quantizing part carries out a quantization of $\pm(n+1)\times fs$ at a probability of $(f/fs-n)\geq \frac{1}{2}$ and a quantization of $\pm n\times fs$ at a probability of $(f/fs-n)<\frac{1}{2}$, with respect to an integer part n of f/fs.

14. An actuator controller using the periodic signal as set forth in claim 1, wherein said periodic signal is a pulse signal.

15. An actuator controller using the periodic signal as set forth in claim 1, wherein said actuating unit is a linear step motor.

16. An actuator controller using the periodic signal as set forth in claim 1, wherein said actuating unit is a rotary step motor.

17. An actuator controller using the periodic signal as set forth in claim 16, wherein said velocity command signal is a rotational angular velocity command value of said movable portion.

18. An actuator controller using the periodic signal as set forth in claim 1, wherein said actuating unit comprises a piezoelectric element.

* * * * *